(12) United States Patent (10) Patent No.: US 11,307,143 B2
Tsyboulski et al. (45) Date of Patent: Apr. 19, 2022

(54) SYSTEMS, APPARATUSES AND METHODS FOR SIMULTANEOUS MULTI-PLANE IMAGING

(71) Applicant: Allen Institute, Seattle, WA (US)

(72) Inventors: Dmitri Tsyboulski, Seattle, WA (US); Natalia Orlova, Seattle, WA (US); Jerome Anthony Lecoq, Seattle, WA (US); Peter Saggau, Seattle, WA (US)

(73) Assignee: Allen Institute, Seattle, WA (US)

( * ) Notice: Subject to any disclaimer, the term of this patent is extended or adjusted under 35 U.S.C. 154(b) by 91 days.

(21) Appl. No.: 16/900,279

(22) Filed: Jun. 12, 2020

(65) Prior Publication Data

US 2020/0309701 A1 Oct. 1, 2020

Related U.S. Application Data

(63) Continuation of application No. PCT/US2018/064909, filed on Dec. 11, 2018.

(Continued)

(51) Int. Cl.
*G01N 21/64* (2006.01)
*G02B 21/00* (2006.01)
*G02B 21/36* (2006.01)

(52) U.S. Cl.
CPC ..... *G01N 21/6458* (2013.01); *G01N 21/6402* (2013.01); *G02B 21/0076* (2013.01); *G02B 21/367* (2013.01)

(58) Field of Classification Search
CPC ........... G01N 21/6458; G01N 21/6402; G02B 21/0076; G02B 21/367

See application file for complete search history.

(56) References Cited

U.S. PATENT DOCUMENTS 6,084,627 A * 7/2000 Cook .................... H04N 1/047
347/248
7,092,595 B2 * 8/2006 Sorin ..................... H04J 14/02
385/1

(Continued)

OTHER PUBLICATIONS

Akerboom et al., Optimization of a GCaMP calcium indicator for neural activity imaging. J Neurosci. Oct. 3, 2012;32(40):13819-40. doi: 10.1523/JNEUROSCI.2601-12.2012.

(Continued)

*Primary Examiner* — David P Porta
*Assistant Examiner* — Djura Malevic
(74) *Attorney, Agent, or Firm* — Smith Baluch LLP

(57) ABSTRACT

A system includes a light source to generate an optical signal having a set of pulses at a first repetition rate. The system also includes a multiplexer circuit to generate a multiplexed optical signal from the optical signal n sets of pulses at a second repetition rate, where the n sets of pulses have different polarization states and are at the first repetition rate. The system also includes a focusing unit to split the multiplexed optical signal into n excitation signals to excite a sample. The system also includes an objective to receive the n excitation signals and to illuminate the sample. The objective and the focusing unit collectively focus each excitation signal of the n excitation signals on a different focal plane of the sample to generate a response signal. The system also includes a demultiplexer circuit to generate n emission signals based on the response signal.

23 Claims, 34 Drawing Sheets

(19 of 34 Drawing Sheet(s) Filed in Color)

Related U.S. Application Data

(60) Provisional application No. 62/754,722, filed on Nov. 2, 2018, provisional application No. 62/597,864, filed on Dec. 12, 2017.

(56) References Cited

U.S. PATENT DOCUMENTS

| | | | | |
|---|---|---|---|---|
| 7,170,598 | B2* | 1/2007 | Walla | G01J 3/4406 250/458.1 |
| 8,073,334 | B2* | 12/2011 | Lee | H04B 10/5167 398/91 |
| 8,284,483 | B2* | 10/2012 | Beaurepaire | G02B 21/0048 359/382 |
| 8,326,151 | B2* | 12/2012 | Lee | H04B 10/564 398/68 |
| 8,488,919 | B1* | 7/2013 | Li | G02B 6/2804 385/11 |
| 8,571,410 | B2* | 10/2013 | Sorin | H04J 14/02 398/68 |
| 8,861,963 | B2* | 10/2014 | Lee | H04J 14/0247 398/68 |
| 9,638,909 | B2* | 5/2017 | Wilson | G02B 21/04 |
| 2005/0259989 | A1* | 11/2005 | Sorin | H04J 14/08 398/79 |
| 2007/0057211 | A1* | 3/2007 | Bahlman | G01N 21/6486 250/584 |
| 2010/0171866 | A1* | 7/2010 | Brady | H04N 5/2254 348/340 |
| 2012/0257196 | A1* | 10/2012 | Raicu | G01J 3/027 356/300 |
| 2015/0015890 | A1* | 1/2015 | Zheng | G01J 3/433 356/450 |
| 2016/0139388 | A1* | 5/2016 | Asundi | G02B 21/365 348/79 |

OTHER PUBLICATIONS

Amir et al., "Simultaneous imaging of multiple focal planes using a two-photon scanning microscope." Optics letters 32.12 (2007): 1731-1733.

Bohndiek et al., Comparison of Methods for Estimating the Conversion Gain of CMOS Active Pixel Sensors. IEEE Sensors Journal 8, 1734 (2008).

Botcheby et al., "Aberration-free three-dimensional multiphoton imaging of neuronal activity at kHz rates." Proceedings of the National Academy of Sciences 109.8 (2012): 2919-2924.

Botcherby et al., Aberration-free optical refocusing in high numerical aperture microscopy. Optics Letters 32, 2007-2009 (2007).

Botcherby et al., An optical technique for remote focusing in microscopy. Optics Communications 281, 880-887 (2008).

Chen et al., Long-range population dynamics of anatomically defined neocortical networks. Elife. May 24, 2016;5. pii: e14679. doi: 10.7554/eLife.14679.

Cheng et al., Simultaneous two-photon calcium imaging at different depths with spatiotemporal multiplexing. Nat Methods. Feb. 2011;8(2):139-42. doi: 10.1038/nmeth.1552. Epub Jan. 9, 2011.

Denk et al., Two-photon laser scanning fluorescence microscopy. Science. Apr. 6, 1990;248(4951):73-6.

Ducros et al., Encoded multisite two-photon microscopy. Proc Natl Acad Sci U S A. Aug. 6, 2013;110(32):13138-43. doi: 10.1073/pnas.1307818110.

International Search Report and Written Opinion in International Patent Application No. PCT/US18/64909 dated Apr. 24, 2019, 12 pages.

Janesik, Photon transfer SPIE Press, 2007, 278 pages.

Ji et al., Technologies for imaging neural activity in large volumes. Nat Neurosci. Aug. 26, 2016;19(9):1154-64.

Na et al., "Technologies for imaging neural activity in large volumes." Nature neuroscience 19.9 (2016): 1154. 28 pages.

Pliss et al., Fluorescence lifetime of fluorescent proteins as an intracellular environment probe sensing the cell cycle progression. ACS Chem Biol. Aug. 17, 2012;7(8):1385-92. doi: 10.1021/cb300065w.

Sofroniew et al., A large field of view two-photon mesoscope with subcellular resolution for in vivo imaging. Elife. Jun. 14, 2016;5. pii: e14472. doi: 10.7554/eLife.14472.

Stirman et al., Wide field-of-view, multi-region, two-photon imaging of neuronal activity in the mammalian brain. Nat Biotechnol. Aug. 2016;34(8):857-62. doi: 10.1038/nbt.3594. Epub Jun. 27, 2016.

Yang et al., Simultaneous Multi-plane Imaging of Neural Circuits. Neuron. Jan. 20, 2016;89(2):269-84. doi: 10.1016/j.neuron.2015.12.012. Epub Jan. 7, 2016.

Extended European Search Report in European Patent Application No. 18889118.8 dated Jul. 28, 2021, 10 pages.

Stirman et al., "Wide field-of-view, multi-region, two-photon imaging of neuronal activity in the mammalian brain—Supplementary Information." Nature biotechnology 34.8 (Aug. 2016) Epub Jun. 27, 2016. 16 pages.

* cited by examiner

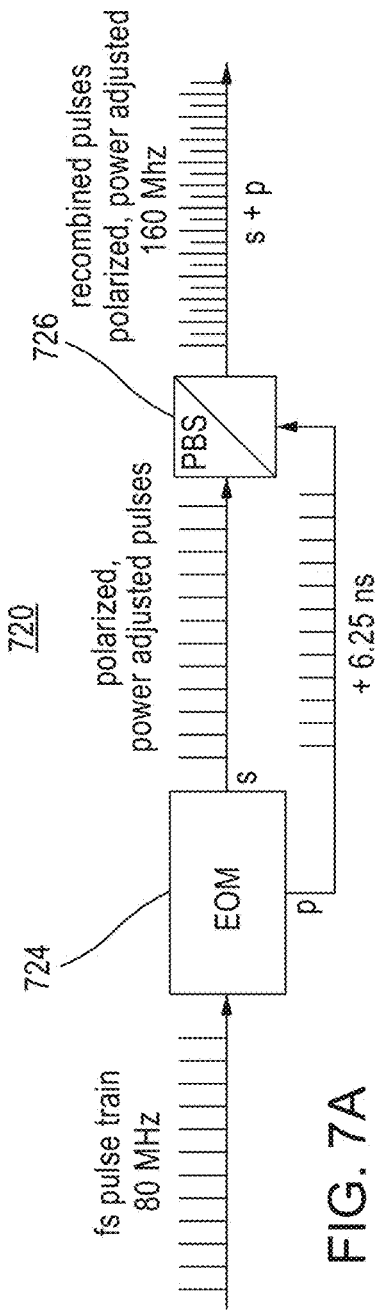
FIG. 7A
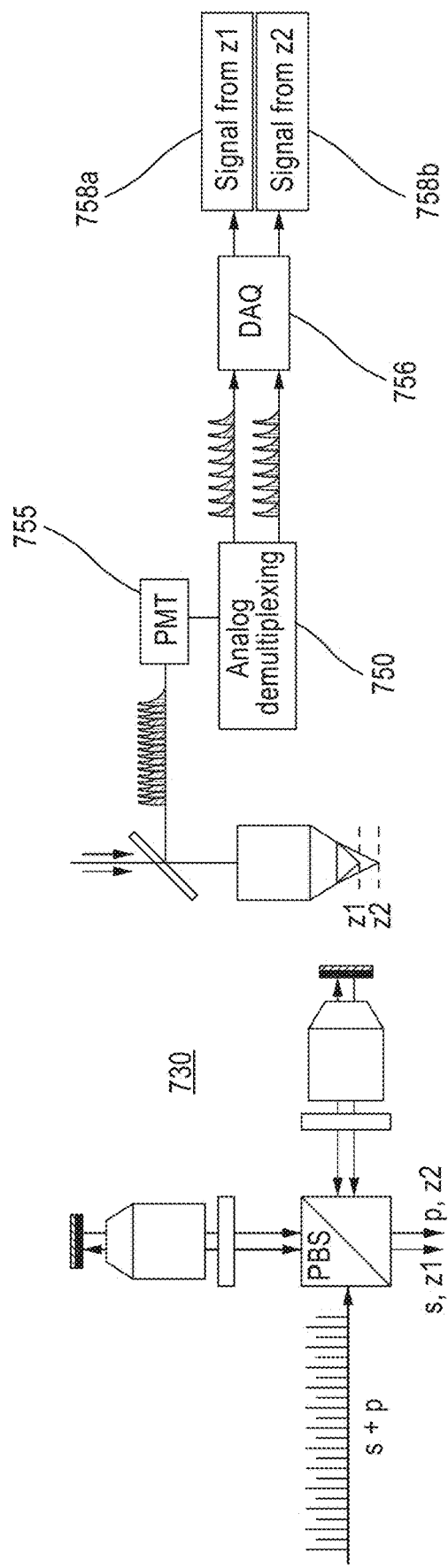
FIG. 7B
FIG. 7C

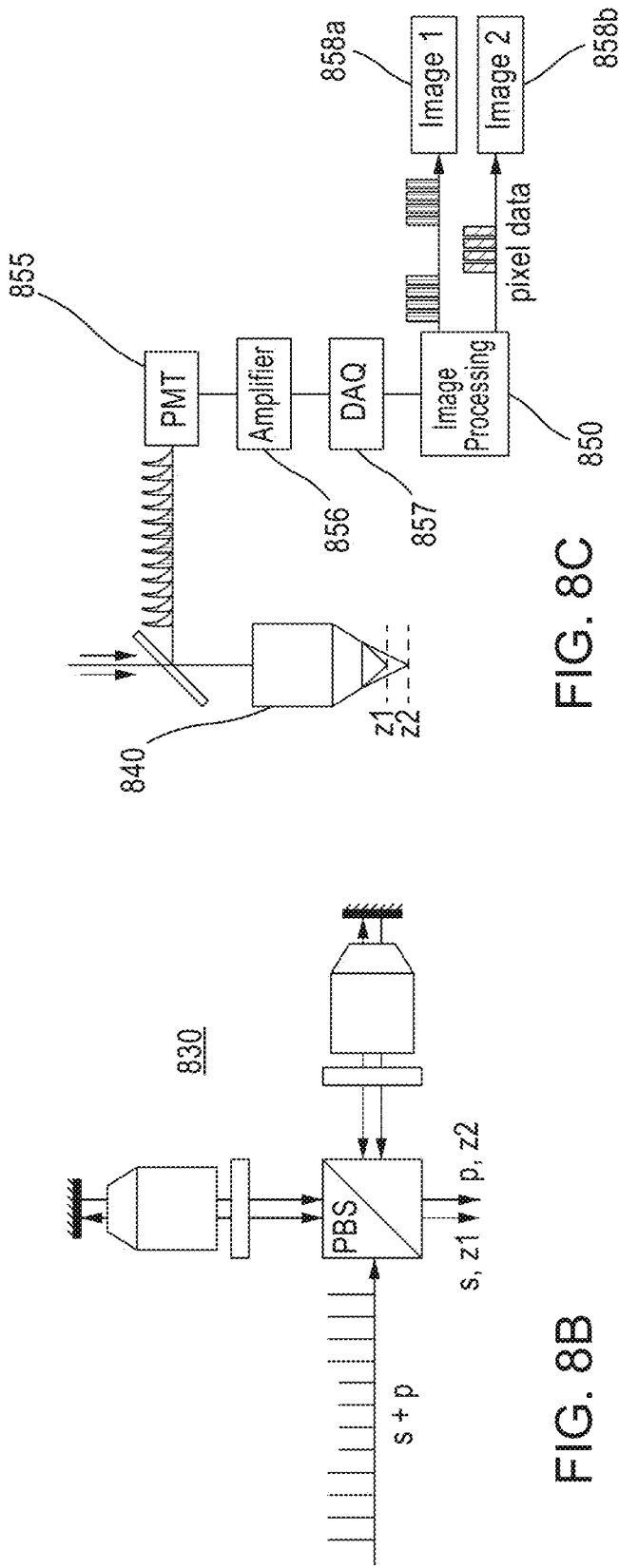
FIG. 8A
FIG. 8B
FIG. 8C

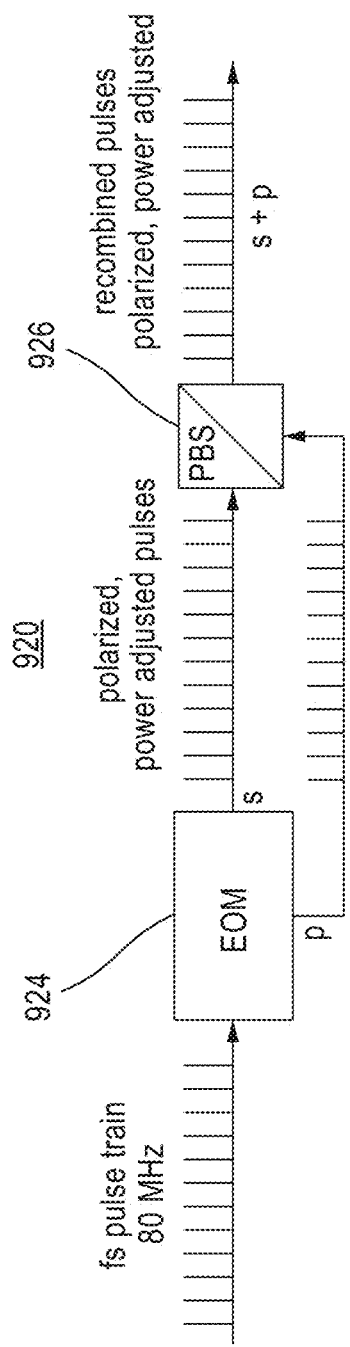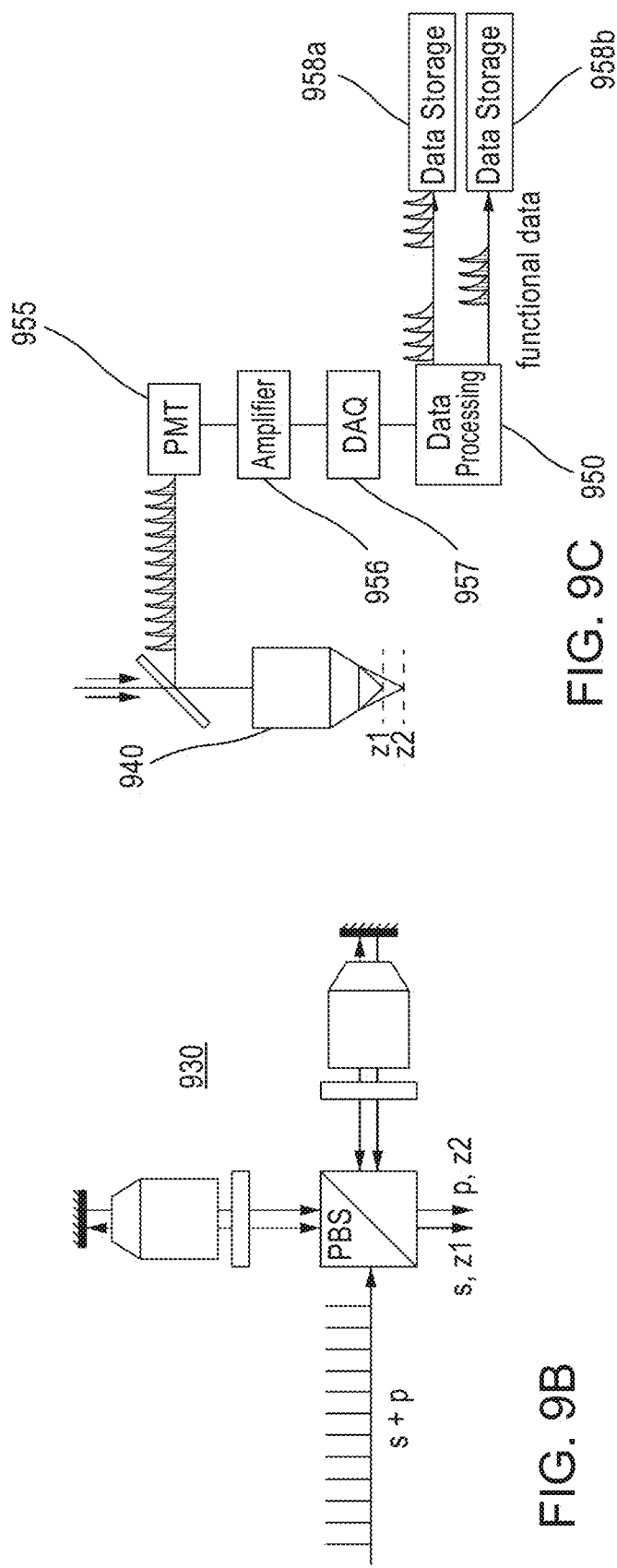
FIG. 9A
FIG. 9B
FIG. 9C

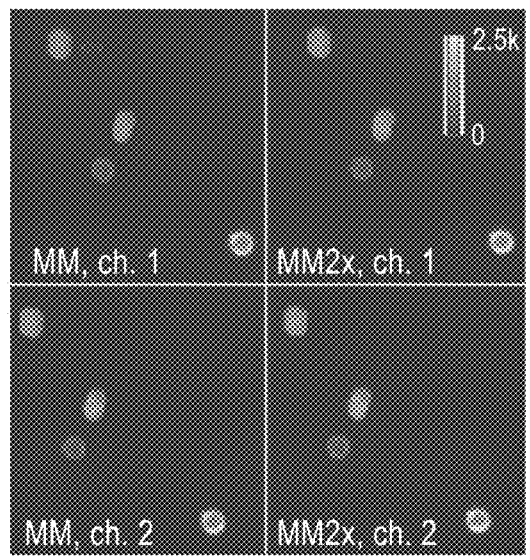 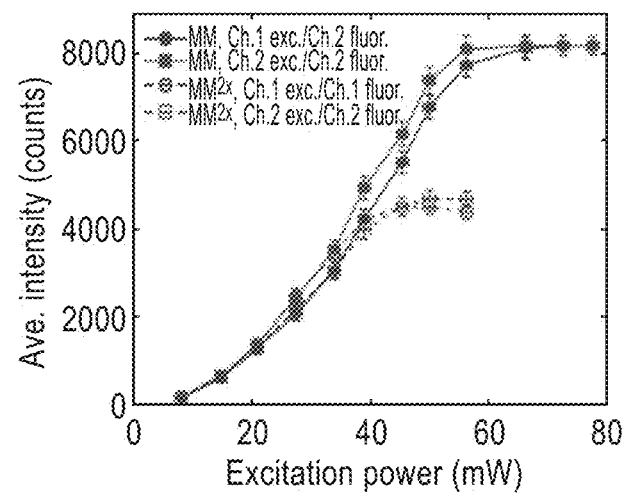
FIG. 23A        FIG. 23B
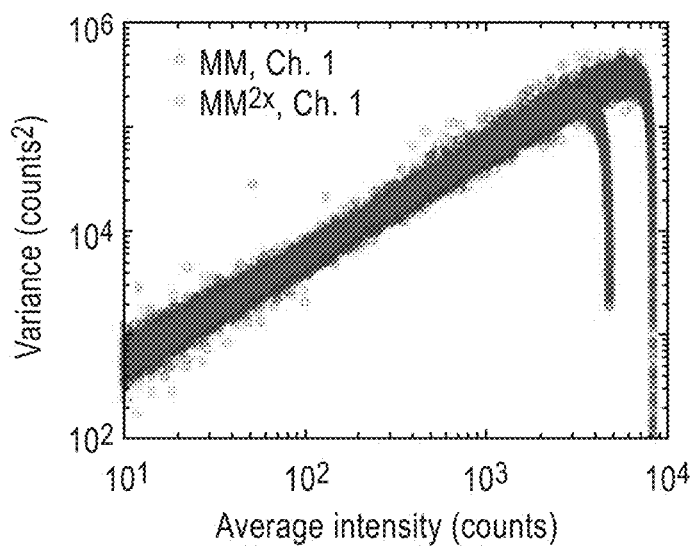
FIG. 23C

Channel 1
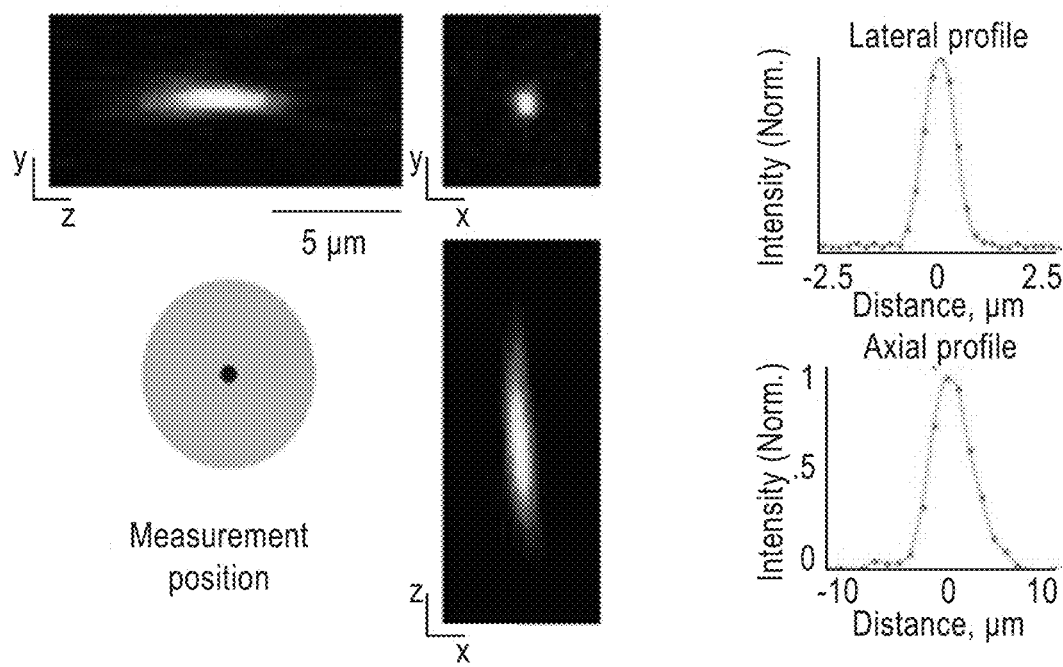
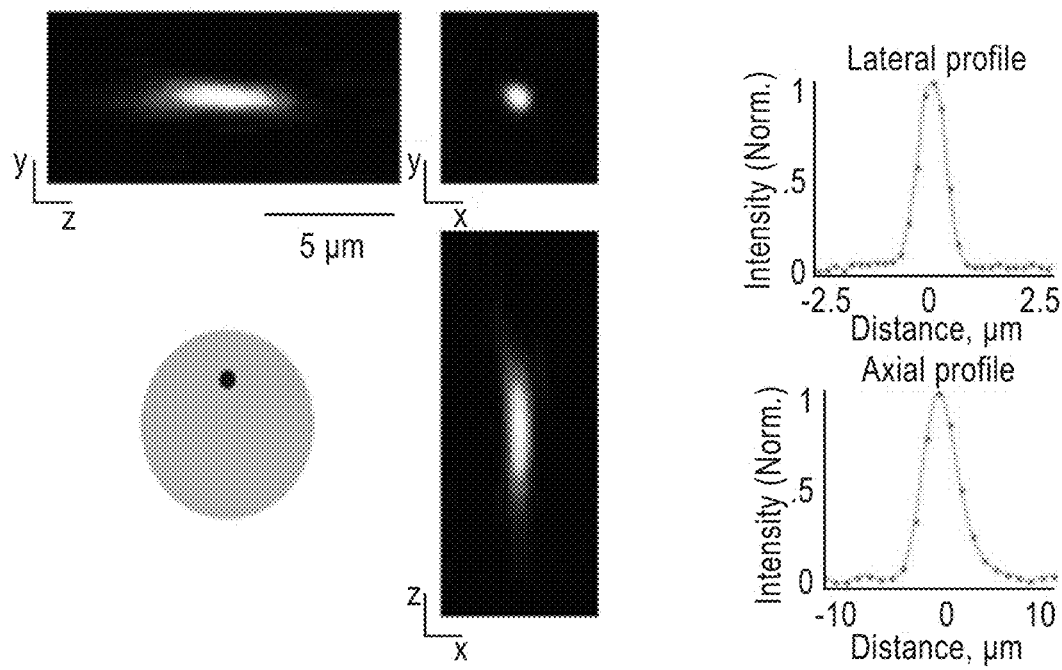
FIG. 24A

Channel 2
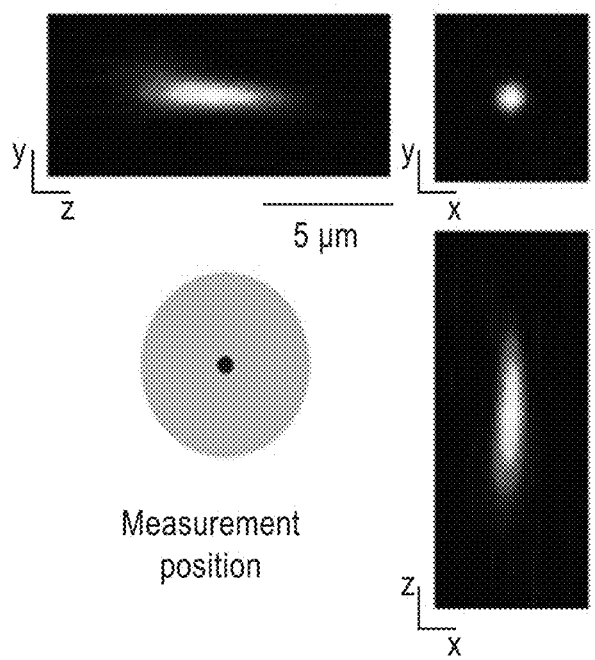
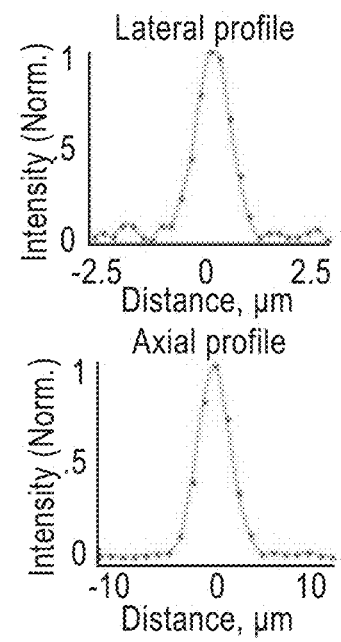
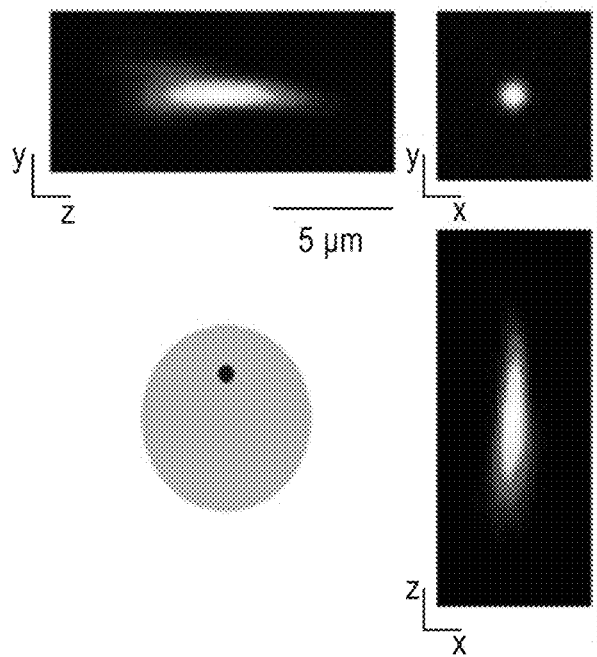
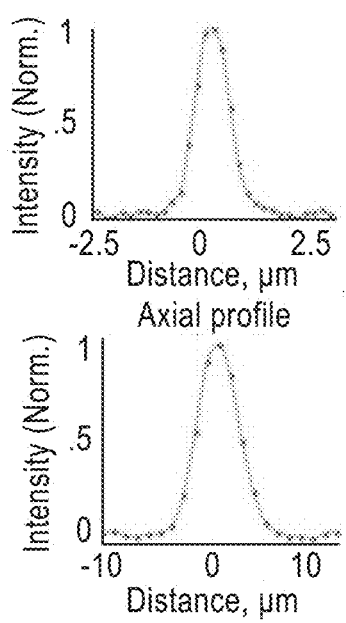
FIG. 24B

FIG. 25A
FIG. 25B
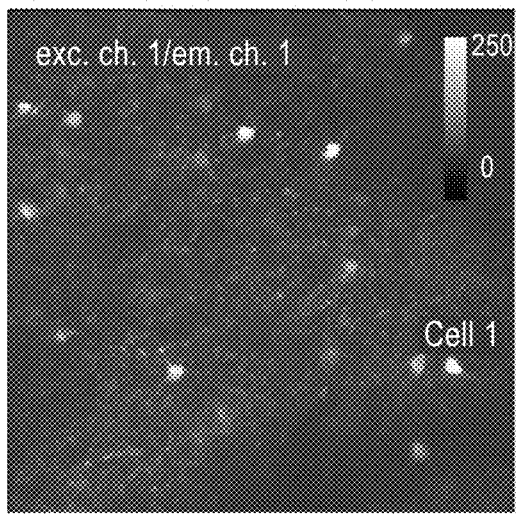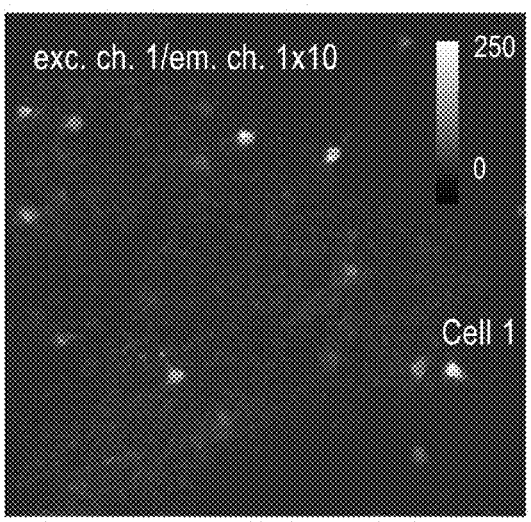
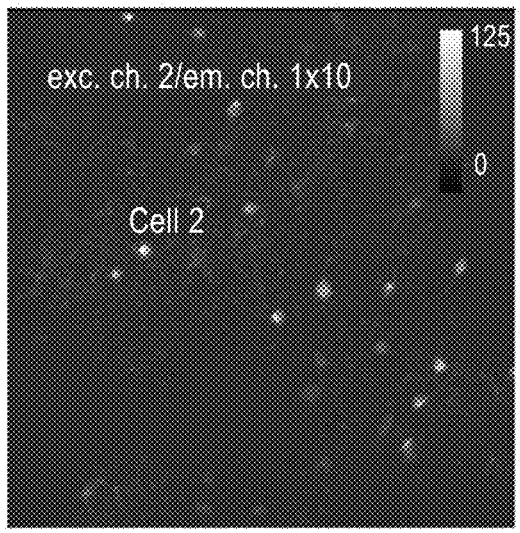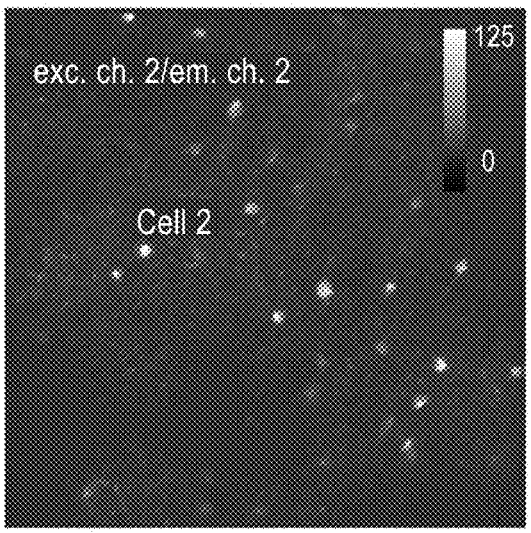
FIG. 25C
FIG. 25D

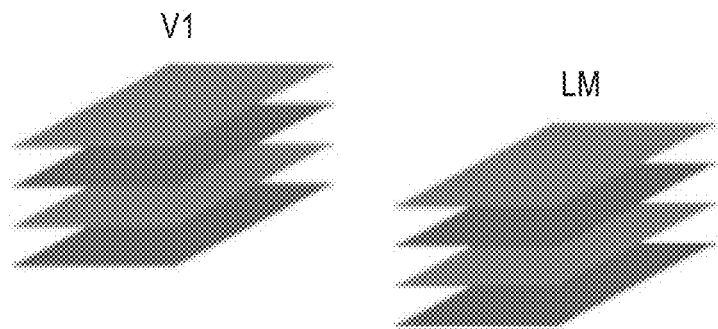
2 VAs, 4 planes each, frame rate 11 Hz
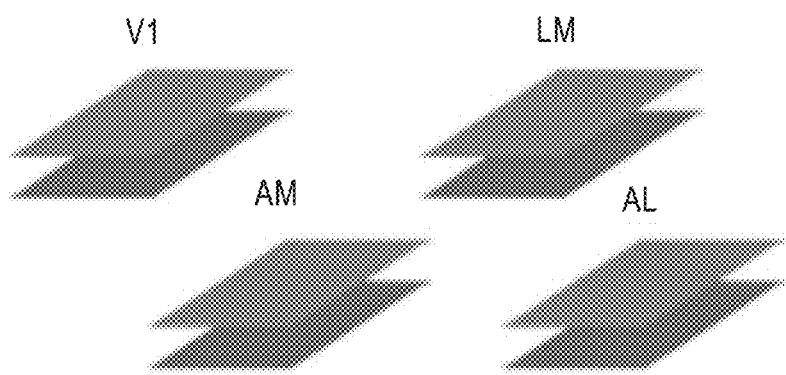
4 VAs, 2 planes each, frame rate 11 Hz
FIG. 27

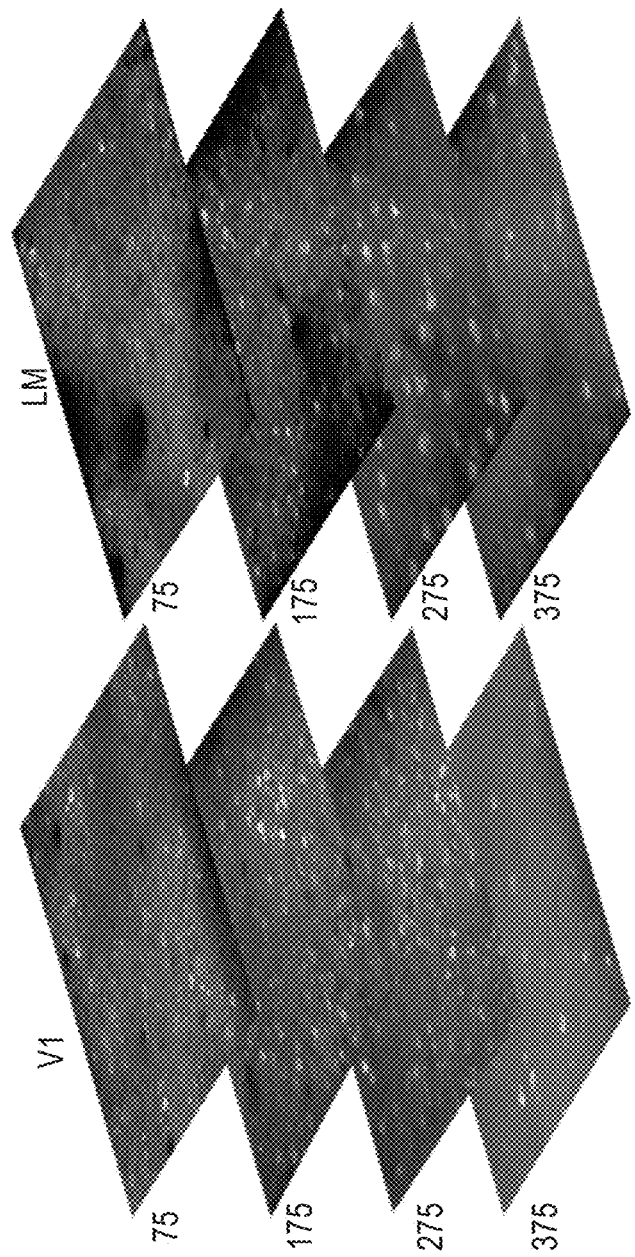

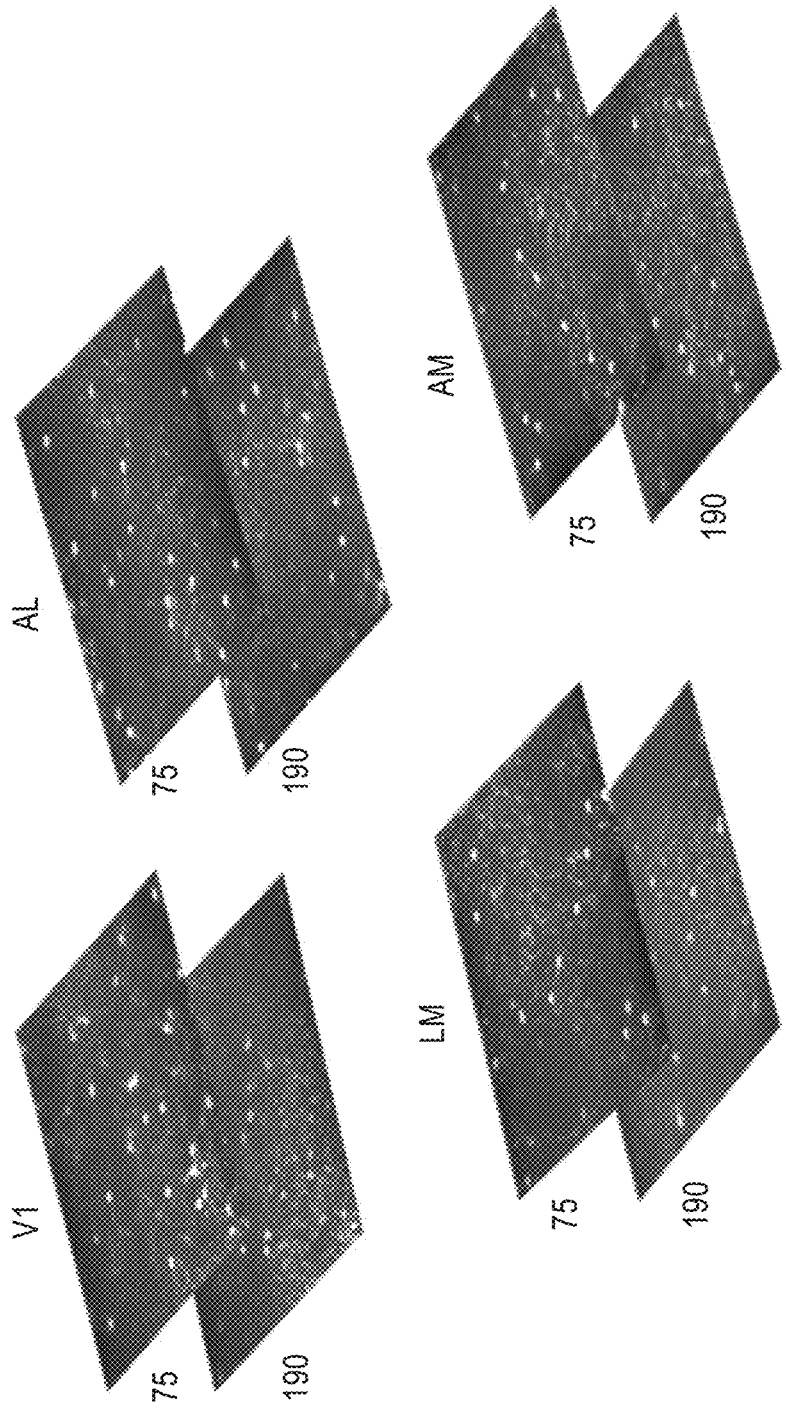

SYSTEMS, APPARATUSES AND METHODS FOR SIMULTANEOUS MULTI-PLANE IMAGING

CROSS-REFERENCE TO RELATED APPLICATIONS

This application is a bypass continuation application of International Application No. PCT/US2018/064909, filed Dec. 11, 2018, titled "SYSTEMS, APPARATUSES AND METHODS FOR SIMULTANEOUS MULTI-PLANE IMAGING," which claims priority to U.S. Provisional Application No. 62/597,864 filed Dec. 12, 2017, titled "METHOD AND APPARATUS FOR DUAL-PLANE REMOTE FOCUSING IMAGING", and to U.S. Provisional Application No. 62/754,722 filed Nov. 2, 2018, titled "METHOD AND APPARATUS FOR DUAL-PLANE REMOTE FOCUSING IMAGING" the entire disclosures of which are hereby incorporated by reference.

TECHNICAL FIELD

The present disclosure relates generally to systems, apparatuses, and methods for simultaneous multi-plane imaging. More specifically, the present disclosure relates to systems, apparatuses, and methods for employing multiple remote focusing units to enable rapid image acquisition.

BACKGROUND

Two-photon laser scanning microscopy (TPLSM) provides high resolution, high contrast images of structures in scattering media. See, for example, U.S. Patent Publication No. 2017/0123196. For example, in a two-photon microscope, a remote focusing unit is used to quickly adjust the Z-position in imaging volume as described in U.S. Pat. No. 9,638,909. However, the speed of imaging in two-photon microscopes is limited by the raster scanning rate, thereby limiting the number of regions of interest that can be imaged sequentially with sufficient temporal resolution.

SUMMARY

In some embodiments, a system includes a light source to generate an optical signal, the optical signal including a set of pulses at a first repetition rate. The system also includes an optical multiplexer circuit to receive the optical signal and to generate a multiplexed optical signal including a set of pulses at a second repetition rate. The second repetition rate is an n-multiple of the first repetition rate. The set of pulses at the second repetition rate includes n sets of pulses, each set of pulses of then set of pulses having a different polarization state than each other of then set of pulses and being at the first repetition rate. The system also includes a focusing unit to receive the multiplexed optical signal and to split the multiplexed optical signal into a set of n excitation signals to excite a sample, each excitation signal of the set of n excitation signals corresponding to a set of pulses of the n set of pulses. The system also includes an objective to receive the set of n excitation signals and to illuminate the sample. The objective and the focusing unit collectively focus each excitation signal of the set of n excitation signals on a different focal plane of the sample than each other excitation signal of the set of n excitation signals to generate a response signal in response to the set of n excitation signals. The system also includes an electronic demultiplexer circuit to separate emission from the different focal planes to generate a set of n emission signals based on the response signal, each emission signal of the set of n emission signals corresponding to an excitation signal of the set of n excitation signals.

In some embodiments, a method includes generating an optical signal including a set of pulses at a first repetition rate, wherein the first repetition rate is an n-multiple of a second repetition rate. The set of pulses at the second repetition rate include n sets of pulses, each set of pulses of the n set of pulses having a different polarization state than each other of the n set of pulses and operating at the first repetition rate. The method also includes splitting the optical signal into a set of n excitation signals to excite a sample, each excitation signal of the set of n excitation signals corresponding to a set of pulses of the n set of pulses. The method also includes focusing each excitation signal of the set of n excitation signals to a different focal plane of the sample than each other excitation signal of the set of n excitation signals to generate a response signal in response to the set of n excitation signals. The method also includes separating emission from different focal planes in the response signal into a set of n emission signals, each emission signal of the set of n emission signals corresponding to an excitation signal of the set of n excitation signals.

In some embodiments, a system includes a laser source to generate an optical signal, the optical signal including a set of pulses at a first repetition rate. The system also includes an electro-optic modulator and a polarizing beam splitter to receive the optical signal and to generate a multiplexed optical signal including a set of pulses at a second repetition rate, wherein the second repetition rate is twice the first repetition rate. The set of pulses at the second repetition rate include a first set of pulses and a second set of pulses each at the first repetition rate, the first set of pulses having a different polarization state than the second set of pulses. The system also includes a focusing unit to receive the multiplexed optical signal and to split the multiplexed optical signal into a first excitation signal and a second excitation signal to excite a sample. The first excitation signal corresponds to the first set of pulses and the second excitation signal corresponds to the second set of pulses. The focusing unit includes a first set of focusing optics and a second set of focusing optics having a different longitudinal axis than the first set of focusing optics. Each of the first set of focusing optics and the second set of focusing optics includes a quarter wave plate, a second objective, and a focusing mirror to independently adjust a position of the focal plane of its corresponding excitation signal. The system also includes an objective to receive the first excitation signal and a second excitation signal and optically coupled to the sample to illuminate the sample and to generate an emission from the sample. The first excitation signal is focused on a first focal plane of the sample and the second excitation signal is focused on a second focal plane of the sample that is different than the first focal plane. The system also includes a detector configured to generate a response signal based on the emission from the sample. The system also includes a switch to separate the response signal into a first emission signal corresponding to the first excitation signal and a second emission signal corresponding to the second excitation signal.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIGS. 7A-7C illustrate components of a system for rapid temporal multiplexing and demultiplexing of temporally interleaved pulse excitation, according to an example embodiment. FIG. 7A illustrates a setup to create temporally interleaved femtosecond laser pulses. FIG. 7B illustrates a dual-plane remote focusing assembly. FIG. 7C illustrates a setup to demultiplex temporally interleaved photoluminescence signals.

FIGS. 8A-8C illustrate components of a system for relatively slower temporal multiplexing and demultiplexing based on switching between s- and p-polarization beams as characterized by scan line or pixel trigger, according to an example embodiment. FIG. 8A illustrates a setup for switching between s- and p-polarization beams. FIG. 8B illustrates a dual-plane remote focusing assembly. FIG. 8C illustrates a scheme to demultiplex acquired photoluminescence signals.

FIGS. 9A-9C illustrates components of a system without temporal encoding where post-processing algorithms are used to extract features of interest from images containing information from both focal planes, according to an example embodiment. FIG. 9A illustrates a setup to switch between s- and p-polarization beams. FIG. 9B illustrates a dual-plane remote focusing assembly. FIG. 9C illustrates a setup to decode functional data from overlaid images with numerical methods.

FIG. 16A illustrates volumetric imaging in a two-photon microscope with dual arm remote focusing. FIG. 16B illustrates simultaneous dual-plane imaging within a large volume, where each imaging plane has independent Z coordinates but the same XY coordinate. FIG. 16C illustrates simultaneous dual-plane imaging within a large volume, where each imaging plane has independent Z coordinates and XY coordinates.

FIG. 21A—channel 1, MM system; FIG. 21B—channel 1, MM2x system; FIG. 21C—channel 2, MM system; FIG. 21D—channel 2, MM2x system.

FIGS. 23A-23C illustrate comparisons of various aspects of the MM and MM2x systems. FIG. 23A illustrates images of a PG sample recorded with MM and MM2x systems using excitation in two imaging channels. The images are recorded at the excitation power of 28 mW, and averaged 100 times. FIG. 23B is a plot of average fluorescence signal intensity of the pollen grain indicated by arrow in FIG. 23A at different excitation power levels. FIG. 23C is a mean-variance plot computed from all recorded PG images in channel 1 of the MM and MM2x systems FIGS. 24A and 24B illustrate examples of recorded point spread function (PSF) in different region of interest in channel 1 (FIG. 24A) and channel 2 (FIG. 24B). The PSF images shown were recorded at the depth of 0 μm.

FIGS. 25A-25D, 26A-26C illustrate cross-talk in functional calcium signal recordings, when laser excitation is present in either the first channel (channel 1) or the second channel (channel 2), and the images are recorded in both imaging channels simultaneously. FIG. 25A illustrates an averaged in vivo image of mouse brain tissue with excitation in channel 1 and detection in channel 1. FIG. 25B illustrates an averaged in vivo image of a mouse brain with excitation in channel 1 and detection in channel 2, with pixel intensities multiplied by 10. FIG. 25C illustrates an averaged in vivo image of a mouse brain with excitation in channel 2 and detection in channel 1, with pixel intensities multiplied by 10. FIG. 25D illustrates an averaged in vivo image of a mouse brain with excitation in channel 2 and detection in channel 2.

FIG. 26A is a plot illustrating calcium signals from Cell 1 in FIGS. 27A and 27B.

FIG. 26B is a plot illustrating calcium signals from Cell 2 in FIGS. 27C and 27D.

FIG. 26C is a plot illustrating the ratio of calcium signal traces from FIGS. 26A and 26B.

FIG. 27 illustrates two example microscope configurations for data acquisition, with two X,Y areas with four longitudinal (Z) planes each and four X,Y planes with two longitudinal planes each. V1—visual cortex; LM—lateromedial area; AM—anteromedial area; and AL—anterolateral area.

FIG. 28A shows an experimental approach for recording ground truth cross-talk, where (first) beam one is blocked and images are acquired on both channels, resulting in recording a clean signal for one pane and clean reading of signal leaking to the second channel. The procedure is repeated with beam two blocked. FIG. 28B shows a 2D histogram of calcium traces from all cells from planes representing signal (horizontal axis) and planes representing crosstalk measurement (vertical axis). A Linear fit is made/illustrated, and its slope is considered as a measurement of crosstalk. FIG. 28C shows linear fits for all pair of planes in one experiment, measured in both directions; and FIG. 28D represents linear fits characterizing crosstalk for all pairs of planes across three experiments.

FIG. 29A shows two planes before unmixing ("Uncorrected" column) where some cells (see arrows) are detected via a segmentation algorithm in both planes. Second column ("Corrected") represents images after crosstalk unmixing. Here, the cells only appear in one plane, and are not detected by the segmentation algorithm. FIG. 29B show calcium traces for a cell in its original plane (blue), for the same cell's activity as detected in the cross-talk plane (orange), while this cell is not detected in the cross-talk plane after unmixing (green).

FIGS. 30A and 30B illustrates in vivo imaging of two cortical columns. The microscope is configured to image in V1 as well as LM, four longitudinal planes each. FIG. 30A corresponds to V1, and FIG. 30B corresponds to LM.

FIGS. 31A-31D illustrate in vivo imaging of four cortical areas. We configured the microscope to image in V1, LM, AL, AM, two longitudinal planes each. FIG. 31A corresponds to V1, FIG. 31B corresponds to AL, FIG. 31C corresponds to LM, FIG. 31D corresponds to AM.

FIG. 32A shows z-scored neuronal activity from 40 cells in V1 and LM of the Vip animal. FIG. 32B shows neuronal activity sorted by the similarity of physiological response. FIG. 35C is a magnified view of the first 10000 frames (corresponding to 1000 seconds of the recording of the z-scored data in FIG. 32A. FIG. 32D is a magnified view of the first 1000 seconds of the sorted data in FIG. 32B.

DETAILED DESCRIPTION

Following below are more detailed descriptions of various concepts related to, and implementations of, systems, devices and methods for simultaneous multi-plane focusing and imaging. It should be appreciated that various concepts introduced above and discussed in greater detail below may be implemented in numerous ways. Examples of specific implementations and applications are provided primarily for illustrative purposes to enable those skilled in the art to practice the implementations and alternatives apparent to those skilled in the art.

The figures and example implementations described below are not meant to limit the scope of the present implementations to a single embodiment. Other implementations are possible by way of interchange of some or all of the described or illustrated elements. Moreover, where certain elements of the disclosed example implementations may be partially or fully implemented using known components, in some instances only those portions of such known components that are necessary for an understanding of the present implementations are described, and detailed descriptions of other portions of such known components are omitted so as not to obscure the present implementations.

Figure 1:
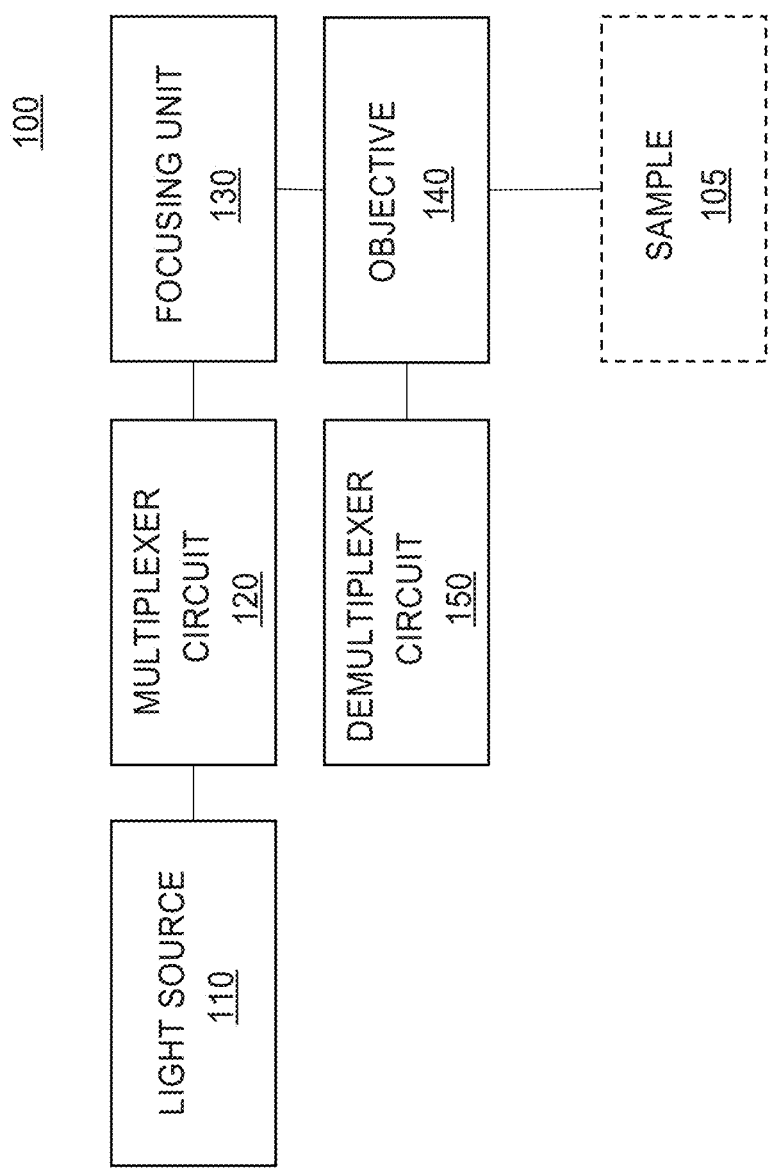
FIG. 1 illustrates a system for multi-plane imaging, according to some embodiments.

FIG. 1 is a block diagram of an environment/system 100 in which multi-plane imaging can be implemented and/or carried out. In some embodiments, aspects of the system 100 can be structurally and/or functionally similar to the systems, apparatuses, and/or devices described herein with respect to FIGS. 3-10, and/or can perform the method 200 described in FIG. 2.

The system 100 includes a light source 110, a multiplexer circuit 120, a focusing unit 130, an objective 140, and a demultiplexer circuit 150. In some embodiments, all components of the system 100 can be included in a common casing such as, for example, a single housing that presents the system 100 as an integrated, one-piece device for a user. In other embodiments, at least some components of the system 100 can be in separate locations, housings, and/or devices. For example, in some embodiments, coupling optics, electrical and/or electronic interconnects, and/or the like, may be employed for connectivity as appropriate.

In some embodiments (not shown), the system 100 includes at least a controller and a memory. In some embodiments, the system 100 can also include a database, although it will be understood that, in some embodiments, the database and the memory can be a common data store. In some embodiments, the database constitutes one or more databases. Further, in other embodiments, at least one database can be external to the system 100. The system 100, and/or a compute device associated therewith, can also include one or more input/output (I/O) interfaces (not shown), implemented in software and/or hardware.

The memory and/or the database can independently be, for example, a random access memory (RAM), a memory buffer, a hard drive, a database, an erasable programmable read-only memory (EPROM), an electrically erasable read-only memory (EEPROM), a read-only memory (ROM), Flash memory, and/or so forth. The memory and/or the database can store instructions to cause the controller to execute processes and/or functions associated with the system 100.

The controller can be any suitable processing device configured to run and/or execute a set of instructions or code associated with the system 100. The controller can be, for example, a suitably programmed processor, a Field Programmable Gate Array (FPGA), an Application Specific Integrated Circuit (ASIC), a Digital Signal Processor (DSP), and/or the like.

The system 100 can be in electronic communication with other systems, apparatuses, and/or devices via one or more networks, each of which can be any type of network such as, for example, a local area network (LAN), a wide area network (WAN), a virtual network, a telecommunications network, and/or the Internet, implemented as a wired network and/or a wireless network. Any or all communications can be secured (e.g., encrypted) or unsecured, as is known in the art. The system 100 can encompass a personal computer, a server, a work station, a tablet, a mobile device, a cloud computing environment, an application or a module running on any of these platforms, and/or the like.

In some embodiments, the light source 110 generates an optical signal that includes a set of pulses at a first frequency/repetition rate. In some embodiments, the light source 110 is a pulsed laser source operating at a wavelength from about 300-2000 nm, including all values and subranges in between. In some embodiments, the light source 110 operates at a wavelength from about 300-1000 nm. In some embodiments, the first repetition rate is from about 1 MHz to about 200 MHz, including all values and sub ranges in between. In some embodiments, the first repetition rate is up to about 80 MHz. In some embodiments, the first repetition rate is from about 80 MHz to about 160 MHz, including all values and subranges in between. In an example embodiment, the system 100 operates in two-photon mode, the light source 110 is a pulsed laser source operating at a wavelength from about 300-1000 nm with a first repetition rate of about 40-160 MHz and a pulse width of about 100-150 fs. In another example embodiment, the system 100 operates in three-photon mode, the light source 110 is a pulsed laser source operating at a wavelength from about 1000-2000 nm with a first repetition rate of about 0.3-5 MHz and a pulse width of about 30-70 fs.

In some embodiments, the multiplexer circuit 120 (also sometimes referred to as an "optical multiplexer circuit") receives the optical signal from the light source and generates a multiplexed optical signal including a set of pulses at a second repetition rate. In some embodiments, the second repetition rate is an n-multiple of the first repetition rate (e.g., 2 times, 3 times, 5 times the first repetition rate, and/or the like). The pulses at the second repetition rate can include n sets of pulses, with each set of pulses having a different polarization state than each other set of pulses, and being at the first repetition rate. In some embodiments, n=2. In some embodiments, n can vary based on factors such as, but not limited to, fluorescence lifetime of the target fluorophore in the sample, the first repetition rate, and/or the like. As an example, in an experiment where the fluorescence lifetime of the sample is about 3 ns and the first repetition rate is 80 MHz, n=2, i.e., two channels can be employed. As another example, in an experiment where the fluorescence lifetime of the sample is about 3 ns and the first repetition rate is 40 MHz, n=4, i.e., four channels can be employed In some embodiments, each set of pulses has a duty cycle of about 50%. For example, the optical signal can include a pulse train at 80 MHz (first repetition rate), and the multiplexed optical signal can have a second repetition rate of 160 MHz (i.e., twice) due to the generation of, from the optical signal, two sets of pulses, one having a s-polarization state and the other having a p-polarization state, each at 80 MHz but delayed with respect to the other.

In some embodiments, the multiplexer circuit 120 can include other reflective elements for beam manipulation, such as, for example, mirrors, including knife-edge mirrors. In some embodiments, and as explained in greater detail herein, the multiplexer circuit 120 can include one or more beam modulators to affect the generation of the n sets of pulses. In some embodiments, the beam modulator(s) includes an electro-optic modulator(s). In some embodiments, the multiplexer circuit 120 can include one or more beam splitters to affect the recombination of the n sets of pulses to generate the multiplexed optical signal. In some embodiments, the beam splitter(s) includes a polarizing beam splitter(s). In some embodiments, the multiplexer circuit includes a delay line, such as an optical fiber for example, to control the temporal delay induced between the n sets of pulses. In some embodiments, the temporal delay/separation is based on, or is selectable based on, a duty cycle associated with each of then sets of pulses. Additionally or alternatively, in some embodiments, the temporal delay/separation is based on, or is selectable based on, a decay time associated with fluorescence emission from the sample in response to the n excitation signals.

In some embodiments, the focusing unit 130 receives the multiplexed optical signal to splits it into n excitation signals to excite the sample 105. Each of n excitation signals corresponding to a set of pulses of the n set of pulses. In some embodiments, each of the n excitation signals can be focused on a different focal plane of the sample via the objective, as described in greater detail herein. Said another way, the focusing unit 130 can modulate the focal depth of each of the n excitation signals to be the same (e.g., when imaging at a depth where a stronger excitation signal is required), or different. In some embodiments, the focusing unit 130 includes n sets of focusing optics, one set of focusing optics for each of the n excitation signals. In some embodiments, each set of focusing optics can include a movable mirror that can be moved to adjust the focal plane of its corresponding excitation signal.

In some embodiments, each set of focusing optics has a longitudinal axis different than the longitudinal axis of the other sets of focusing optics. In some embodiments, the focusing unit 130 can include a beam splitter, such as a polarizing beam splitter, to split the n excitation signals along the longitudinal axis of its respective set of focusing optics. In some embodiments, each set of focusing optics can also include a quarter wave plate to phase-shift its corresponding excitation signal to permit recombination along the same optical path using the same polarizing beam splitter, as described in greater detail herein. In some embodiments, each set of focusing optics can include an objective (each sometimes referred to as a "second objective").

The focusing unit 130 can sometimes be referred to as a "remote focusing unit", and each set of focusing optics can also sometimes be referred to as a focusing unit/remote focusing unit.

In some embodiments, the system 100 can further include a scanning unit, such as an XY scanning unit (e.g., a galvanometer scanner), between the multiplexer circuit 120 and the focusing unit 130. In this manner, each of the n excitation signals can be scanned in its respective focal plane.

In some embodiments, the system 100 can further include in the optical path, and prior to the focusing unit 130, a beam splitter to separate/split the n set of pulses. Using n=2 as an example, the beam splitter can separate the first set of pulses and second set of pulses. In such embodiments, the system 100 can further include a first scanning unit in the optical path between the beam splitter and the focusing unit 130 to receive the first set of pulses and to scan the first set of pulses in its respective image plane in the sample 105. The system 100 can also include a second scanning unit in the optical path between the beam splitter and the focusing unit 130, to receive the second set of pulses and to scan the second set of pulses in its respective focal plane in the sample. In this manner, focal planes with not only different depth/Z axis values in the sample are possible, but with different XY parameters as well.

In some embodiments, the objective 140 (also sometimes referred to as a "first objective") receive the set of n excitation signals from the focusing unit and illuminates the sample 150. In this manner, the objective and the focusing unit collectively focus each of the n excitation signals on a different focal plane of the sample 105. The sample can generate a response signal (e.g., fluorescence, phosphorescence, and/or the like) in response to the n excitation signals. Similar to the multiplexed optical/excitation signal, the response signal can also be a multiplexed representation of multiple responses/emissions from the sample 105.

In some embodiments, the system 100 can further include a scanning unit, such as an XY scanning unit (e.g., a galvanometer scanner), between the focusing unit 130 and the objective 140. In this manner, each of the n excitation signals can be scanned in its respective focal plane.

In some embodiments, a light detector, such as a photomultiplier tube (PMT) or a camera, receives the response signal. In some embodiments, the system includes a demultiplexer circuit 150 (also sometimes referred to as an "electronic demultiplexer circuit") to separate one or more emission signals from the response signal. In some embodiments, the demultiplexer circuit 150 generates n emission signals based on the response signal, where each emission signal generated by the demultiplexer circuit corresponds to one of the n excitation signals, and reflects the sample response to that excitation signal. In some embodiments, the response signal and/or the indication of the response signal received by the demultiplexer circuit 150 is an analog signal, and the demultiplexer circuit 150 can be any suitable circuit, such as an analog switch, to separate the response signal into the n analog emission signals. In some embodiments, the indication of the response signal received by the demultiplexer circuit 150 is a digital signal, such as from a digital to analog converter (DAC) coupled to a PMT detector. In some embodiments, the response signal is an image, and the demultiplexer circuit executes one or more image processing techniques to generate n emission images as then emission signals. In some embodiments, the demultiplexer circuit 150 includes a high-speed switching circuit, such as a radio-frequency circuit for example, to generate the n emission signals. In some embodiments, the demultiplexer circuit 150 generates then emission signals based on one or more reference/timing signals received from the light source 110.

Figure 2:
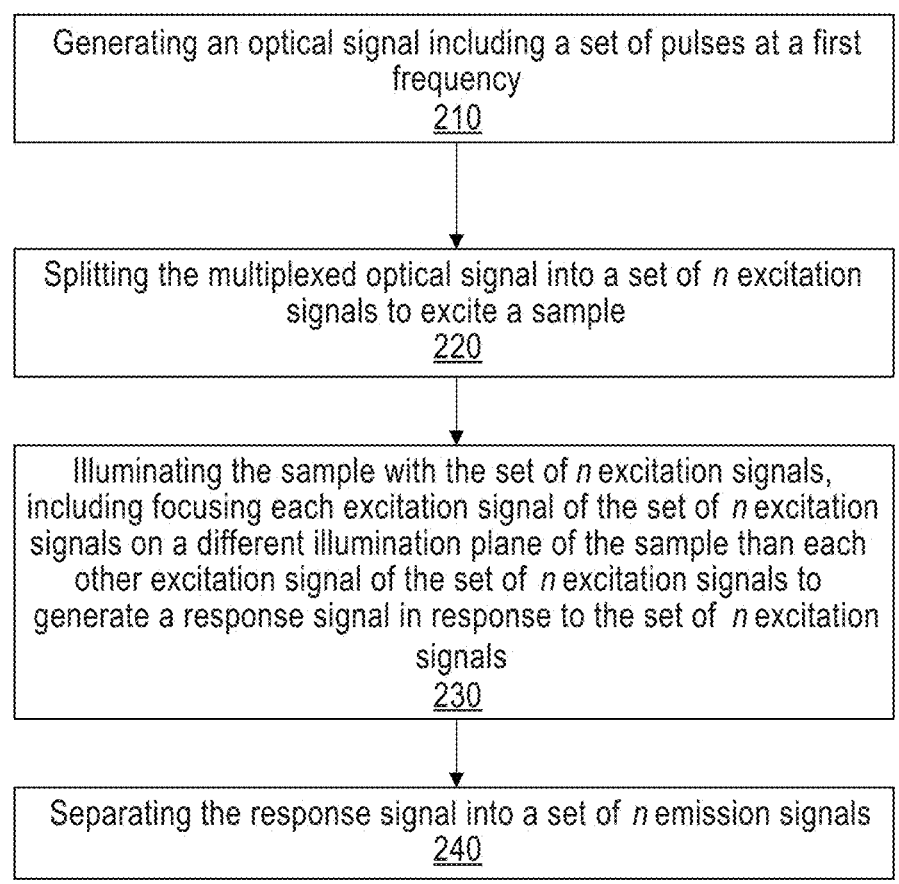
FIG. 2 illustrates a method for multi-plane imaging, according to some embodiments.

FIG. 2 illustrates a method for multi-plane imaging, according to some embodiments. In some embodiment, some or all aspects of the method 200 can be implemented by one or more of the systems, apparatuses, and/or devices as described herein such as, for example, the systems and/or components thereof illustrated in FIGS. 1, 3-10.

The method 200 includes, at 210, generating an optical signal including a set of pulses at a first frequency/repetition rate (e.g., via the multiplexer unit 120 of FIG. 1). The first repetition rate (e.g., 160 MHz) is an n-multiple of a second repetition rate (e.g., 80 MHz). The set of pulses at the second repetition rate includes n sets of pulses, with each of the n sets of pulses having a different polarization state and operating at the first repetition rate. In some embodiments, however, the polarization state of two or more of the n set of pulses can be the same. In some embodiments, then sets of pulses include two sets of pulses, and the generating further includes generating the two set of pulses as a first set of s-polarized pulses and a second set of p-polarized pulses.

The method 200 also includes, at 220, splitting the multiplexed optical signal into a set of n excitation signals to excite a sample. Each of n excitation signals corresponds to one set of pulses of then set of pulses.

The method 200 also includes, at 230, focusing each excitation signal of the set of n excitation signals to a different focal plane of the sample than each other excitation signal of the set of n excitation signals, so as to generate a response signal in response to the set of n excitation signals. In some embodiments, the method 200 further includes independently adjusting a position of the focal plane of each excitation signal (e.g., via a movable mirror of the focusing unit 130). In some embodiments, the method 200 further includes scanning each excitation signal of the set of n excitation signals in its respective focal plane in the sample.). In some embodiments, the method 200 further includes each set of pulses of the n sets of pulses in its respective focal plane in the sample. In some embodiments the n sets of pulses include a first set of pulses and a second set of pulses, and the method 200 further includes splitting the first set of pulses and the second set of pulses. In such embodiments, the method 200 further includes scanning the first set of pulses in its respective focal plane in the sample, and scanning the second set of pulses in its respective focal plane in the sample. In some embodiments, the method 200 further includes receiving, via a detector, the response signal.

The method 200 also includes, at 240, separating the response signal into a set of n emission signals, each emission signal of the set of n emission signals corresponding to an excitation signal of the set of n excitation signals. In some embodiments, the separating at 240 further includes separating the response signal into the set of n emission signals, and/or generating the set of n emission signals, based on a set of reference signals.

In some embodiments, a system includes a laser source to generate an optical signal, the optical signal including a set of pulses at a first repetition rate. The system also includes an electro-optic modulator and a polarizing beam splitter to receive the optical signal and to generate a multiplexed optical signal including a set of pulses at a second repetition rate. The second repetition rate is twice the first repetition rate, and the set of pulses at the second repetition rate include a first set of pulses and a second set of pulses each at the first repetition rate. The first set of pulses have a different polarization state than the second set of pulses.

The system also includes a focusing unit to receive the multiplexed optical signal and to split the multiplexed optical signal into a first excitation signal and a second excitation signal to excite a sample. The first excitation signal corresponds to the first set of pulses and the second excitation signal corresponds to the second set of pulses. The focusing unit includes a first set of focusing optics and a second set of focusing optics having a different longitudinal axis than the first set of focusing optics. Each of the first set of focusing optics and the second set of focusing optics includes a quarter wave plate, a second objective, and a minor to independently adjust a position of the focal plane of its corresponding excitation signal. Each of the first set of focusing optics and the second set of focusing optics further includes an objective to receive the first excitation signal and a second excitation signal and optically coupled to the sample to illuminate the sample and to generate an emission from the sample. The first excitation signal is focused on a first focal plane of the sample and the second excitation signal is focused on a second focal plane of the sample that is different than the first focal plane. The system also includes a detector configured to generate a response signal based on the emission from the sample. The system also includes a radio-frequency switch to separate the response signal into a first emission signal corresponding to the first excitation signal and a second emission signal corresponding to the second excitation signal.

While described hereon with respect to a focusing unit having two sets of focusing optics (also sometimes referred to as "dual plane remote focusing") for simplicity, it is understood that systems with three or more sets of focusing optics are within the scope of the embodiments disclosed herein. It is also understood that similarly named and/or referenced components (e.g., the light source 110 and the laser/light source 310 in FIG. 3) can be structurally and/or functionally similar unless explicitly noted otherwise.

Figure 3:
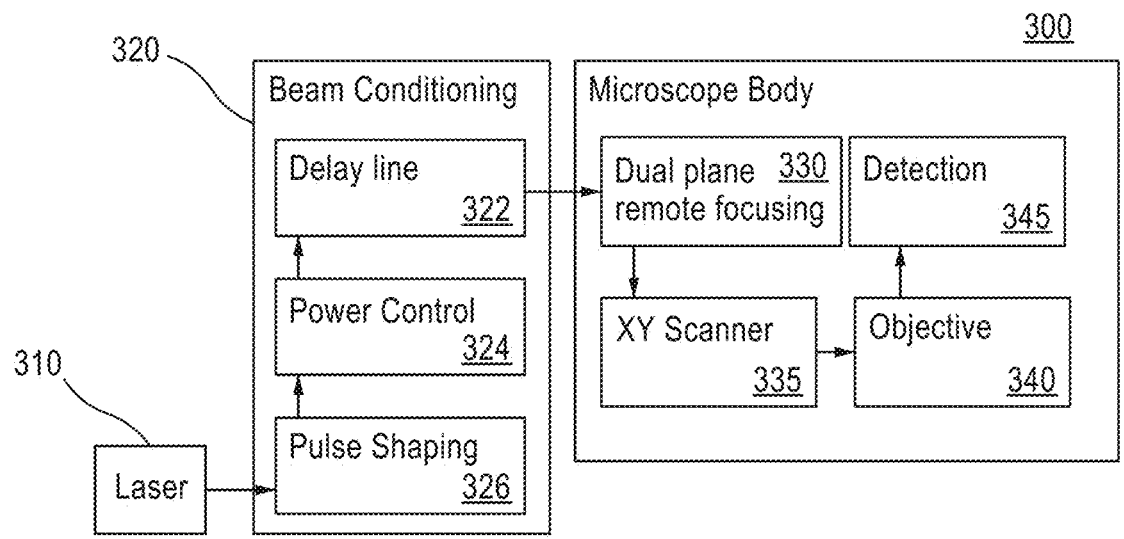
FIG. 3 illustrates placement of a dual plane remote focusing unit prior to scanning optics, according to an example embodiment.

In some embodiments, the system can include one or more scanning assemblies/units. Based on the position of the focusing unit with respect to the scanning assembly (e.g., an XY scanner), different configurations are possible. FIG. 3 illustrates an example system 300 including a laser light source 310 and a multiplexer circuit 320. The beam conditioning/multiplexer circuit 320 can include a laser power control component 324 and a pulse shaping unit 326 for modifying laser characteristics. The beam conditioning unit 320 can also include a delay line, and the output of the beam conditioning unit 320 is a multiplexed optical signal as described herein. The system 300 also includes, within a microscope body/casing, a dual plane remote focusing unit 330 that receives the multiplexed optical signal and generates two excitation signals. An XY scanner 335 receives the two excitation signals and scans each excitation signal in its respective focal plane in the X, Y directions. An objective 340 applies the scanned two excitation signals to a sample (not shown), and a detector 345 captures a response signal from the sample.

Figure 4:
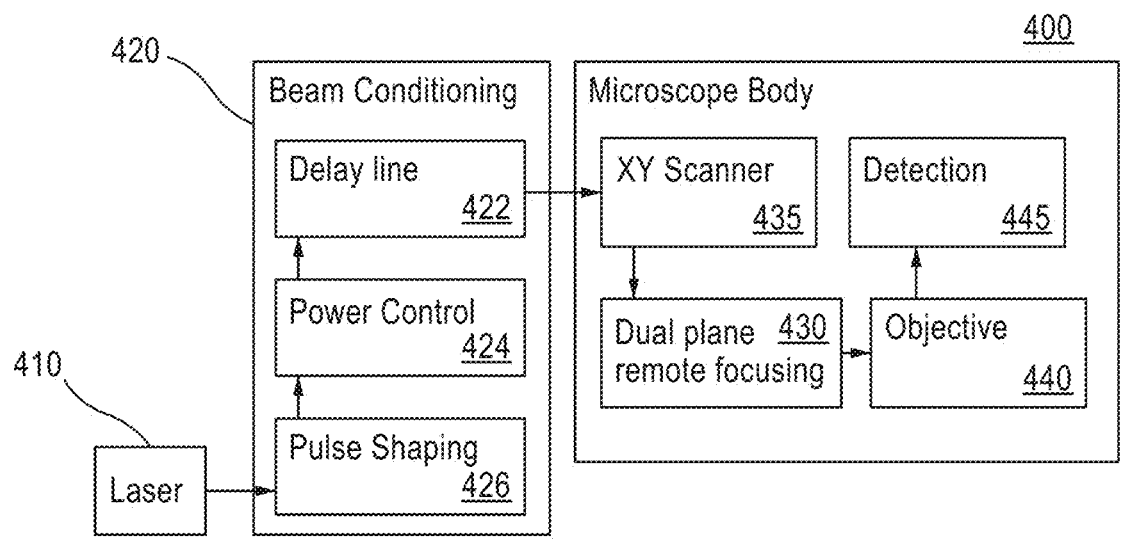
FIG. 4 illustrates placement of a dual plane remote focusing unit after scanning optics, according to an example embodiment.

FIG. 4 illustrates another example system 400 having a laser 410 and a multiplexing unit 420 that can be similar to those in FIG. 3. Here, the XY scanner 435 receives the multiplexed optical signal, and the dual plane remote focusing unit 430 is downstream of the XY scanner 435.

Figure 5:
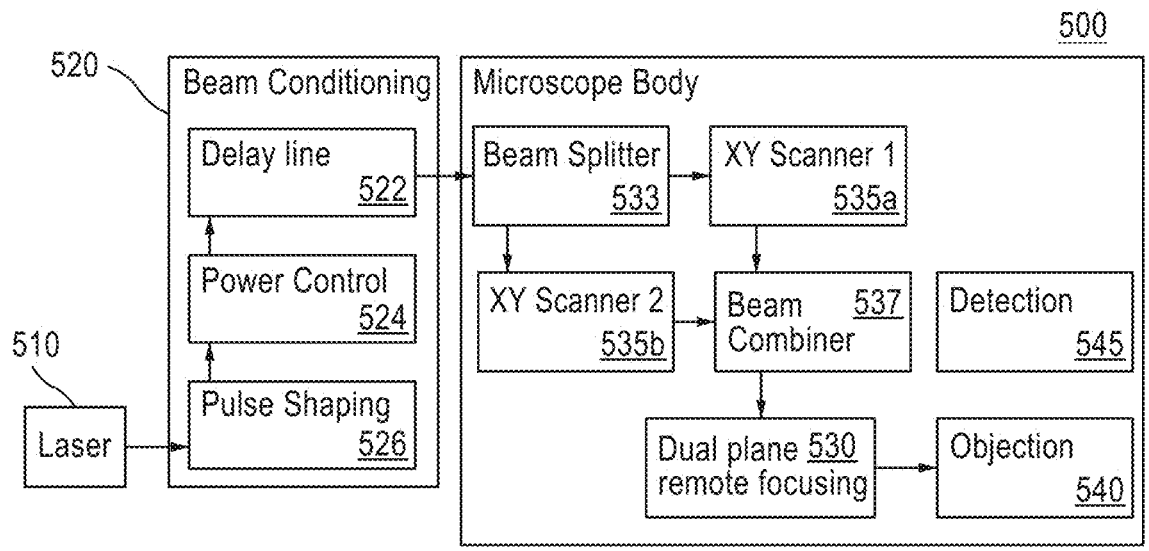
FIG. 5 illustrates placement of a dual plane remote focusing unit after two independent sets of scanning optics, according to an example embodiment.

FIG. 5 illustrates another example system 500 having a laser 510 and a multiplexing unit 520 that can be similar to those in FIG. 3. A beam splitter 533 (e.g., a polarizing beam splitter) separates the first and second set of pulses, which are sent to respective XY scanners 535a, 535b. A beam combiner 537 (e.g., another polarizing beam splitter) recombines the two sets of pulses, which are then transmitted to a dual plane remote focusing unit for generating the two excitation signals.

Figure 6:
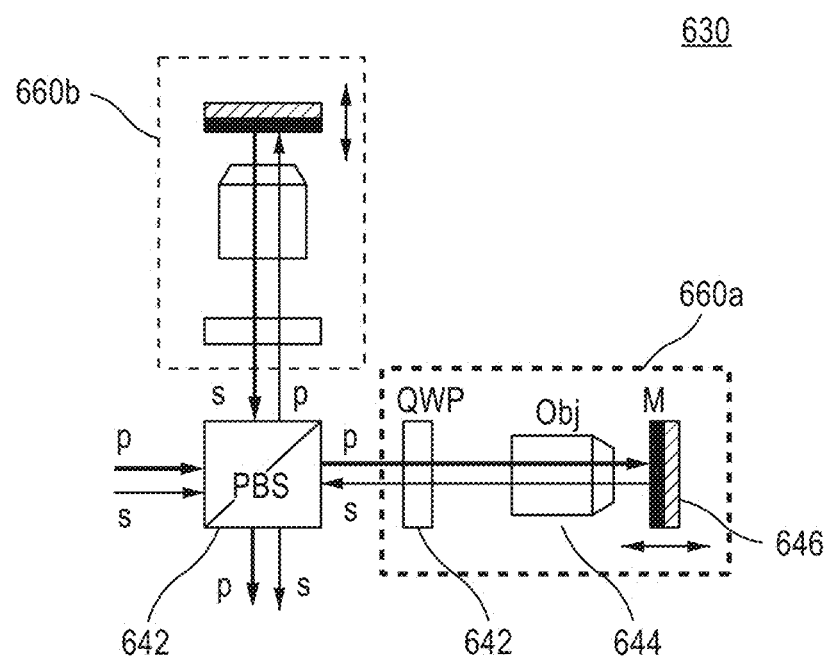
FIG. 6 illustrates a dual plane remote focusing unit, according to some embodiments. PBS—polarizing beam splitter; QWP—quarter waveplate; Obj—objective lens; M—remote focusing mirror; s—s-polarized light; p—p-polarized light.

FIG. 6 illustrates detail for an example dual plane remote focusing unit 630. The multiplexed optical signal includes s- and p-polarized sets of pulses, which are split by a polarizing beam splitter 642, permitting the s-set of pulses to transmit to a first set of focusing optics 660a, and reflecting the p-set of polarizing optics to a second set of focusing optics 660b, which (as illustrated) can include identical optics to the set of optics 660a. Described with respect to the set of optics 660a, each of the sets of optics 660a, 660b can include a quarter wave plate 642, an objective 644 (also sometimes referred to as a "remote objective"), and a movable mirror 646. The quarter wave plate can change the polarization of the incoming set of pulses as well as the outgoing set of pulses by 90° each, such that the set of pulses returned to the beam splitter 642 is rotated by 180°. In this manner, the set of optics 660a generates p-set of pulses from the incident s-set of pulses, and the set of optics 660b generates s-set of pulses from the incident p-set of pulses. This permits recombination of the sets of pulses received by the polarizing beam splitter 642 from the sets of optics 660a, 660b along a common optical path, as illustrated in FIG. 6. In some embodiments, the position of the movable mirror 646 can be independently adjusted to affect the Z-position, or depth, of the focal plane of its corresponding set of pulses. In some embodiments, the movable mirror 646 can be a focusing mirror (also sometimes referred to as a "remote focusing mirror").

FIGS. 7A-7C illustrate example setups of various components of the system 100, assuming a pulses laser light source (not shown) that generates a femtosecond pulse train at 80 MHz. FIG. 7A illustrates a multiplexer circuit 720 for creation of the multiplexed optical signal as temporally interleaved femtosecond pulses. The pulse train is applied to an electro-optic modulator 724, which generates s- and p-polarized sets of pulses. The p-set of pulses are transmitted via a delay line (e.g., an optical fiber) that induces a temporal delay of 6.25 ns prior to recombination with the s-set of pulses via a polarizing beam splitter 726 to generate the multiplexed optical signal at 160 MHz.

FIG. 7B illustrates application of the multiplexed optical signal of FIG. 7A to a dual plane remote focusing unit 730, which can be similar to the unit 630 illustrates in FIG. 6. As illustrated in FIGS. 7B-7C, the two excitation signals generated by the focusing unit 730 include a s-polarized excitation signal that is focused at a depth z1 in a sample (not shown), a p-polarized excitation signal that is focused at a depth z2, different than z1, in the sample. FIG. 7C also illustrates collection of a response signal from the sample via a photomultiplier tube 755. The response signal includes temporally interleaves responses due to the two excitation signals, that are not separable and/or otherwise distinguishable via the PMT 755. A demultiplexer circuit 750, illustrated here as an analog demultiplexing unit (e.g., a switching circuit), separates the interleaved responses into two emission signals. In the example embodiment of FIG. 7C, a data acquisition board (DAQ) 756 collects the emission signals over multiple XY values to generate separate signals 758a, 758b for focal planes/positions z1, z2 respectively. In some embodiments (not shown), the signals 758a, 758b can be the basis of generating corresponding images for focal planes/positions z1, z2. Briefly, the image(s) can be generated in a rasterscan manner, and the timing of the lateral scanners can be used to assign a given pixel the intensity value from the detector, integrated over the time when the scanner was passing an X-Y location in the sample that corresponds to the given pixel.

FIGS. 8A-8C illustrate other example setups of various components of the system 100. FIG. 8A illustrates multiplexed optical signal generation such that the multiplexed optical signal has the same repetition rate as the input laser signal. Specifically, instead of interleaving single s- and p-pulses as illustrates in FIG. 7A, groups of s- and p-pulses are interleaved, with the p-pulses being adjusted for lower power than the s-pulses. FIG. 8B illustrates generation of two excitation signals in a manner similar to FIG. 7B. FIG. 8C illustrates response signal collection via a PMT 855, which is then amplified via an amplifier unit 856. A DAQ 857 and an image processing unit 850 (e.g., executed in a processor) collectively analyze the amplified response signal to separate the pixel data at each z1, z2 position to generate corresponding images 858a, 858b, respectively based on the temporal encoding shown in FIG. 8A. For example, the DAQ 857 can decompose the pixel data into two by deinterleaving pixels based on pixel clock timing.

FIGS. 9A-9C illustrate other example setups of various components of the system 100 for purposes of functional analysis such as, for example, estimating neuronal activity via calcium imaging. FIG. 9A illustrates multiplexed optical signal generation such that the multiplexed optical signal has the same repetition rate as the input laser signal, and such that the s- and p-pulses are overlaid in the multiplexed optical signal. In other words, there is no temporal encoding/delay between the s- and p-sets of pulses upon recombination by the polarizing beam splitter 926. FIG. 9B illustrates generation of two excitation signals in a manner similar to FIG. 7B. Since the response signal does not include temporal separation between the two emission signals, FIG. 9C illustrates that a DAC 957 and a data processing unit 950 can be used to temporally separate the functional data 958a, 958b. As a non-limiting example, the data processing unit 950 can employ one or more computational approaches such as, but not limited to, independent component analysis, source demixing, and/or the like, to separate out the signal from different focal planes into the functional data 958a, 958b.

Figure 10:
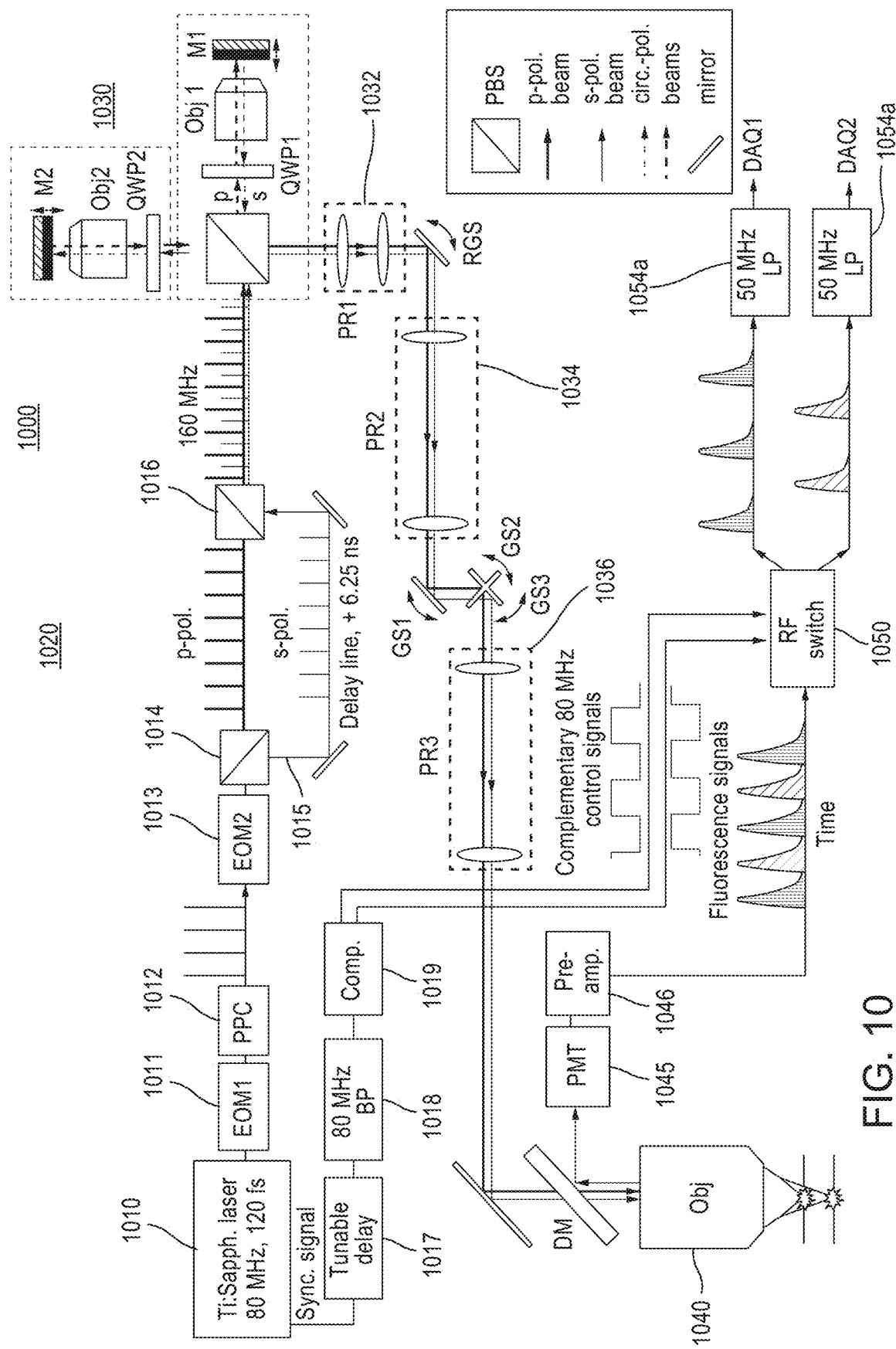
FIG. 10 illustrates an example dual-plane multiphoton imaging system with temporally multiplexed excitation and emission. EOM—electro-optical modulator; PPC—pulse prism compressor; Obj—objective; RFU—remote focusing unit; M—mirror; QWP—quarter wave plate; PR—pupil relay; RFS—resonance galvanometer scanner; GS—galvanometer scanner; DM—dichroic mirror; PMT—photomultiplying tube; BP—band-pass filter; LP—low-pass filter; DAQ—data acquisition channel.

FIG. 10 illustrates an example system 1000, according to some embodiments. In some embodiments, FIG. 10 illustrates a modified Multiphoton Mesoscope (Thorlabs) system having a dual-plane remote focusing unit 1030 and temporal-domain multiplexing/demultiplexing capabilities, as detailed herein. The system 1000 includes a laser source 1010, illustrated here as a Ti:Sapphire laser operating at 80 MHz. The system 1000 also includes a demultiplexer unit 1020 with two EOMs 1011, 1013 in series. Two EOMs positioned in series can achieve complete power input control in both focal/imaging planes and can allow for more efficient use of available laser power. The first EOM 1011 controls the total power input, while the second EOM 1013 controls power slitting ratio between two beams by rotating polarization of incoming laser beam before the polarizing beam splitter 1014. The multiplexing unit also includes a pathway/delay line 1015 for the orthogonally polarized beam to provide temporal delay of 6.25 ns.

Splitting the incoming beam/optical signal which consist of a series of ultrashort pulses into two orthogonally polarized beams with the PBS 1014, delaying one relative to another by 6.25 ns, and recombining these beams with the PBS 1916 effectively creates temporal encoding of the excitation pulse trains. The beams are directed to the dual-plane remote focusing unit 1030 which first decouples orthogonally polarized beams and directs them to the two remote focusing units with independently positioned mirrors M1 and M2. The remote focusing unit 1030 then recombines the beams again and directs them to the XY scanning optics GS1, GS2, GS3. In this configuration, the focal/imaging planes are positioned independently in axial direction while remaining coupled laterally. PMT 1045 (e.g., H11706-40, Hamamatsu) signals are amplified with a 400 MHz amplifier 1046 (e.g., HCA-400M-5K-C, Femto) and directed to a custom demultiplexing circuit 1050. As illustrated, in some embodiments, the circuit 1050 can be based on a radio-frequency (RF) switch (e.g., CMD196C3, Custom MMIC). The system 1000 also includes beam positioning optics 1032, 1034, 1036.

In some embodiments, temporal demultiplexing can require synchronization with laser operating frequency, which dithers in time. Here, an 80 MHz bandpass filter 1018 and a comparator 1019 (e.g., LTC6957-HMS3, Analog Devices) are employed to derive complimentary RF signals for RF switch control from femtosecond laser synchronization signal output. These control/reference signals are complementary square wave signals with peak-to-peak amplitudes of about 5 V and a common mode of about −1.0 V. After demultiplexing, high-bandwidth signals are passed through 50 MHz low-pass filters 1054a, 1054b (Mini-Circuits) and directed to digitizer inputs DAQ1, DAQ2 (e.g., NI FlexRIO, National Instruments). Control software (ScanImage, Vidrio LLC) customized by Vidrio can provide full controls for both the dual plane remote focusing unit 1030 and the EOMs 1011, 1014 and can accommodate scanning with two imaging planes.

Figure 11:
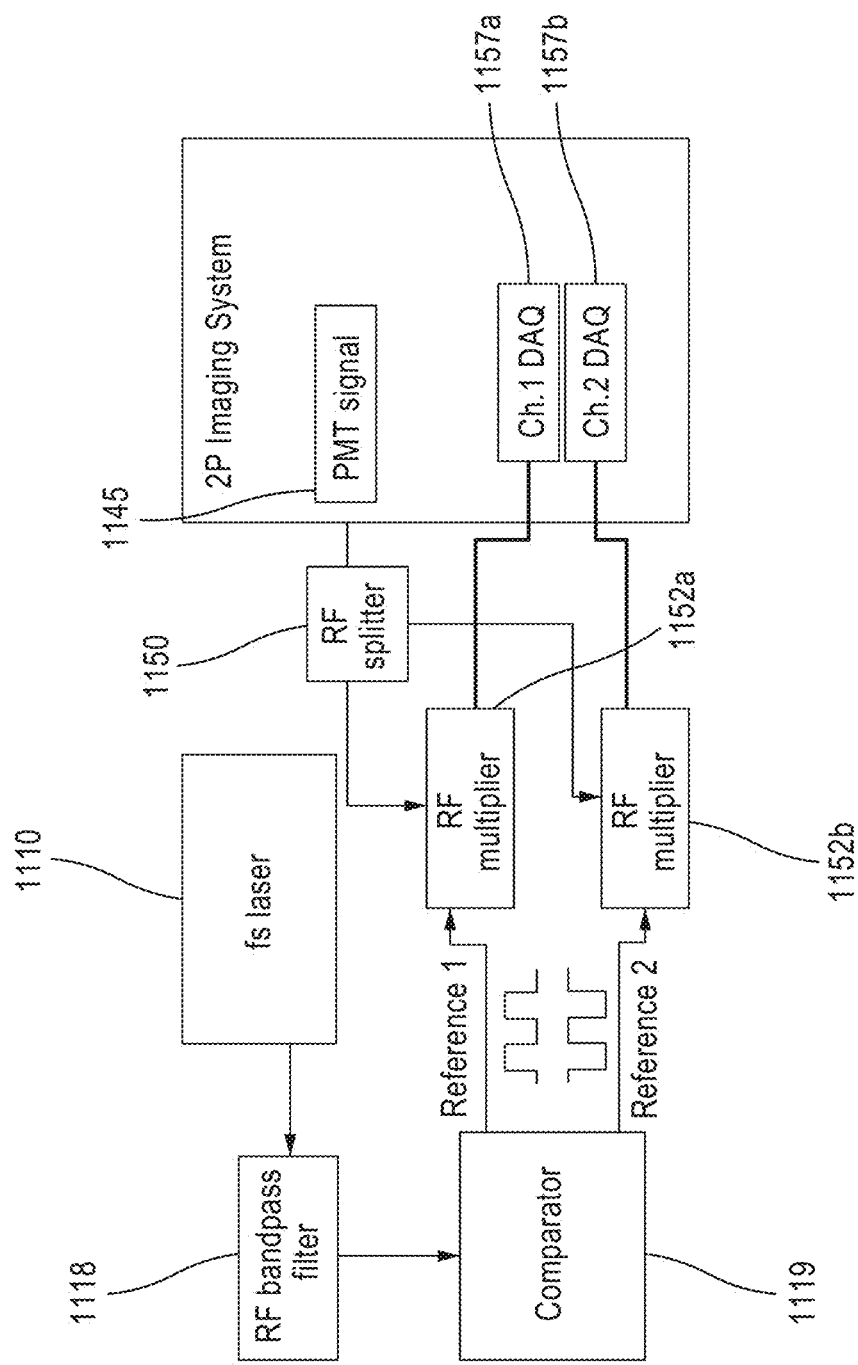
FIG. 11 illustrates an example scheme/setup to decode temporally interleaved photoluminescence signals with analog multiplication.

FIG. 11 illustrates an example embodiment for decoding temporally interleaved photoluminescence signals (in the response signal) using analog multiplication. The synchronization signal from the light source 1110, a femtosecond laser in this example, is applied to a RF bandpass filter 1118 and a comparator 1119 to generate two square-wave reference signals. The detected signal from the detector/PMT 1145 is split using an RF splitter 1150. The two signals from the RF splitter 1150 are multiplied with the reference signals via RF multipliers 1152a, 1152b respectively, and then subsequently digitized via DAQ 1157a, 1157b respectively.

Figure 12:
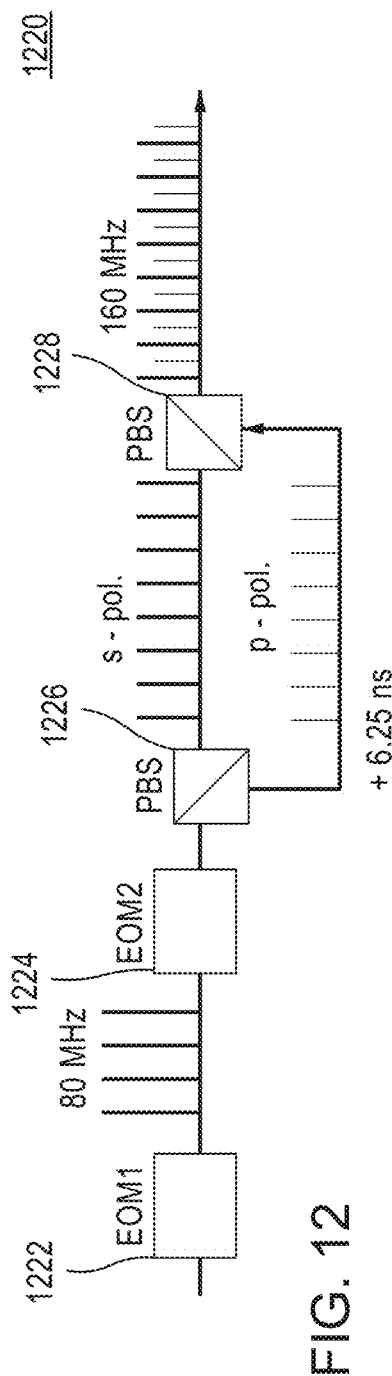
FIG. 12 illustrates an example setup for controlling power of s- and p-polarized beams.
Figure 13:
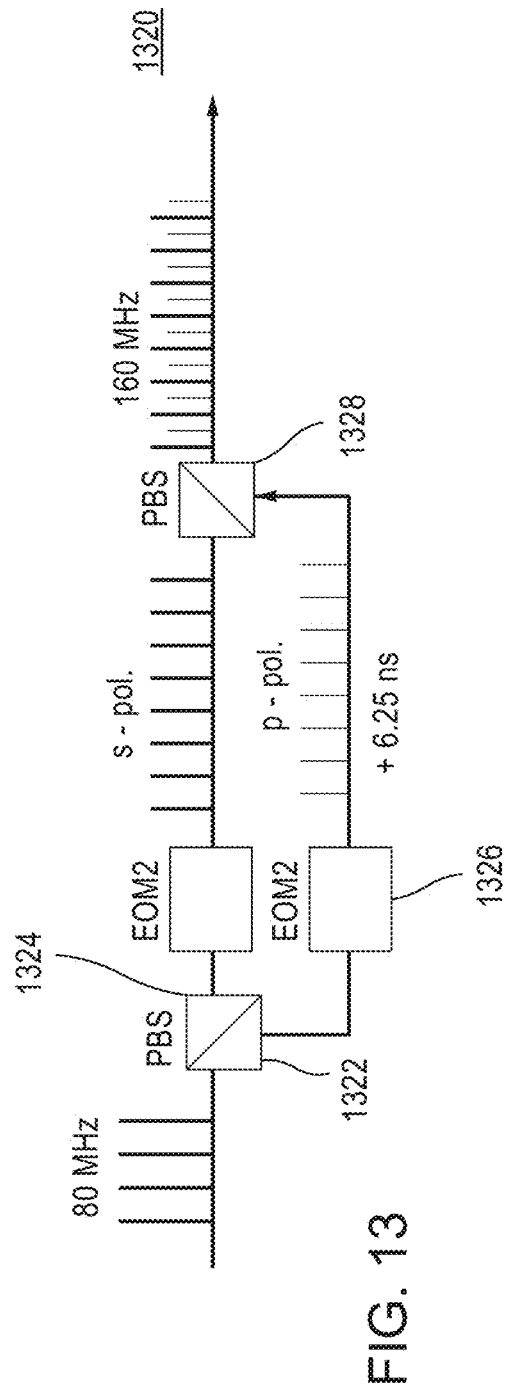
FIG. 13 illustrates another example setup for controlling power of s- and p-polarized beams.

FIGS. 12-13 include additional detail on example approaches for controlling power of the s- and p-sets of pulses. FIG. 12 illustrates a setup/approach similar to FIG. 10, where a first EOM 1222 controls total power input, while a second EOM 1224 controls power splitting ration between the s- and p-sets of pulses. FIG. 13 illustrates a setup/approach where power of each set of pulses is modulated inline, post-splitting by the beam splitter 1322. The first EOM 1324 controls power level of the s-set of pulses, and the second EOM 1326 controls power level of the p-set of pulses.

Figure 14A:
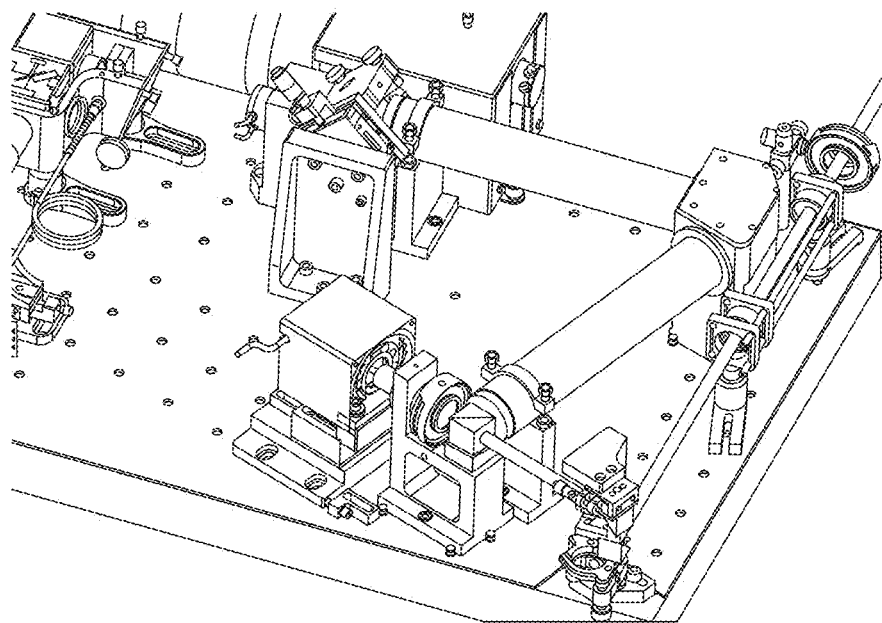
FIGS. 14A-14B are CAD drawings illustrating a portion of a system with (FIG. 14B) and without (FIG. 14A) a remote focusing unit.
Figure 14B:
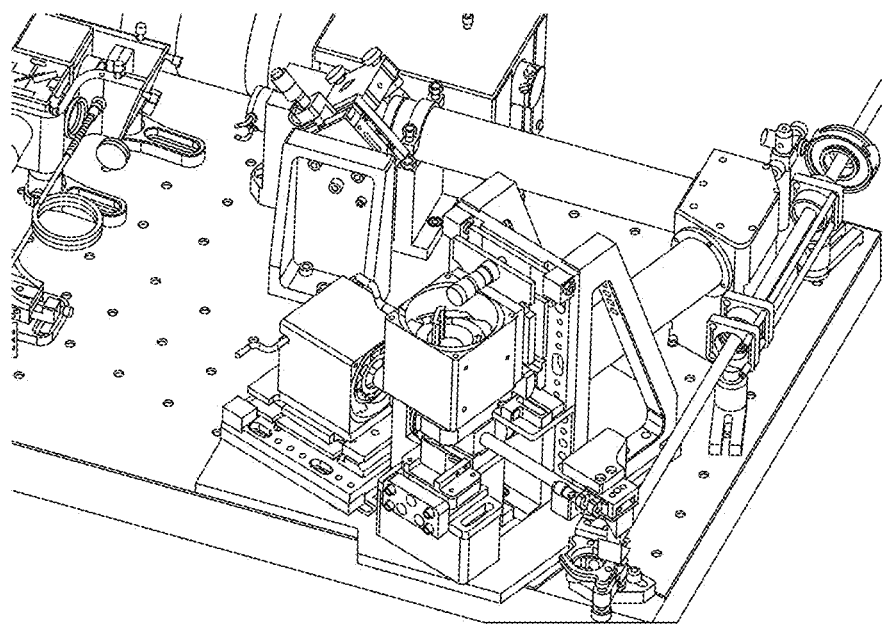
Figure 14C:
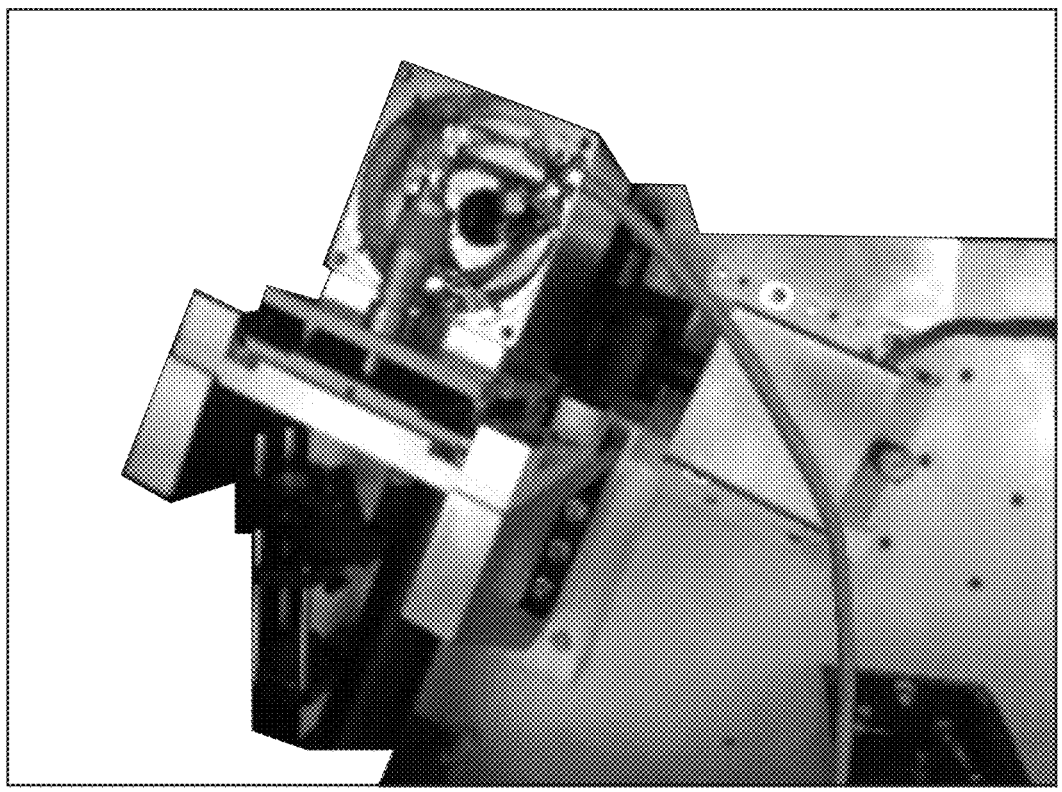
FIG. 14C is an image of an installed focusing unit assembly.

FIGS. 14A-14C illustrate an example approach of adding on a focusing unit, such as a dual plane remote focusing unit described herein, as a removable attachment to existing systems. FIG. 14A illustrates a CAD model of the original system without a second remote focusing unit, and FIG. 14B shows a CAD model of the attachment that contains two remote focusing units, added to the system of FIG. 14A. FIG. 14C is a photograph of an example dual-plane remote focusing add-on module installed on a breadboard of an existing system. In such embodiments, the dual-plane remote focusing module can be designed as an attachment which can be mounted and taken off an existing system without the need to modify existing components. One such example of dual-plane remote focusing module addition can be as follows, for a breadboard mounted optical system. First, a two-piece coupling plate can be mounted on the breadboard using existing screw holes. Then a fast/rapid translation stage, mounting brackets, and the secondary remote focusing unit are mounted on this plate (FIG. 2b). Assuming some mechanical constraints, the secondary s-polarized beam after the beam splitter (cube) can be directed orthogonally to the breadboard towards the second remote focusing unit (with the first remote focusing unit and the second remote focusing unit positioned relative to each other in a manner similar to that illustrated for focusing unit 1030 in FIG. 10). In some embodiments, this mechanical design fits inside a Multiphoton Mesoscope (Thorlabs, Inc.) enclosure without restricting the breadboard's XYZ and tilt adjustments.

Figure 15A:
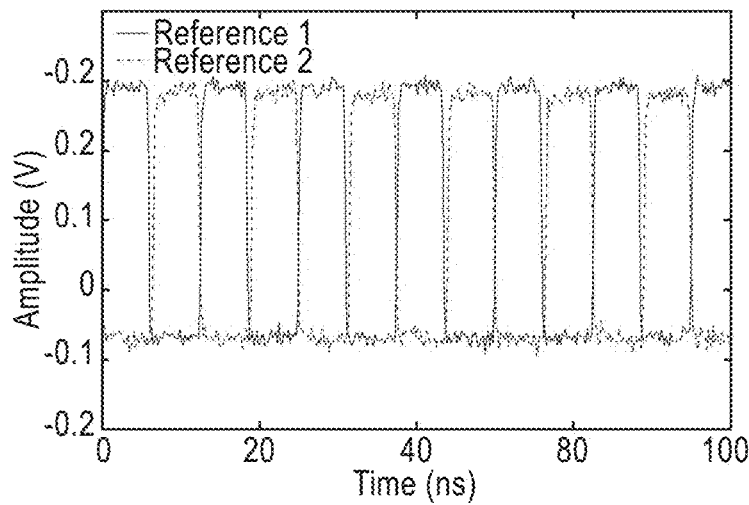
FIGS. 15A-15C illustrate two reference signals derived from a synchronization signal from a femtosecond laser, with different duty cycles of approximately 50% (FIG. 15A), 45% (FIG. 15B), and 30% (FIG. 15C), respectively.
Figure 15B:
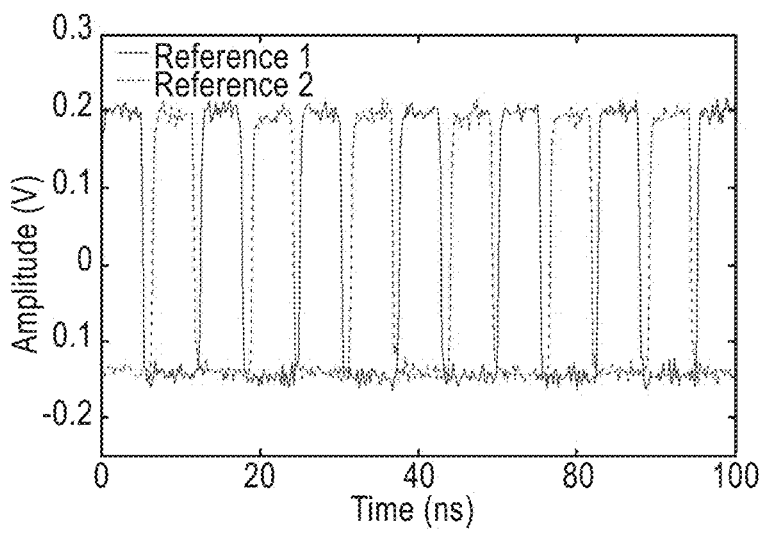
Figure 15C:
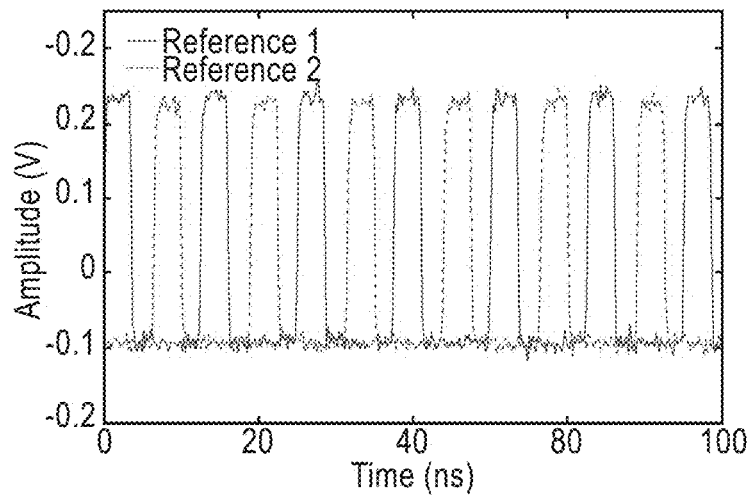

As disclosed herein, in some embodiments, one or more reference signals can be derived from the light source (e.g., a pulsed laser source) for use in temporal decoding of the response signal. FIGS. 15A-15C illustrate some example reference signals derived from a femtosecond laser signal, with different duty cycles. The duty cycle of the reference signals in FIG. 15A is about 50%. The duty cycle of the reference signals in FIG. 15B is about 45%. The duty cycle of the reference signals in FIG. 15C is about 30%.

Figure 16A:
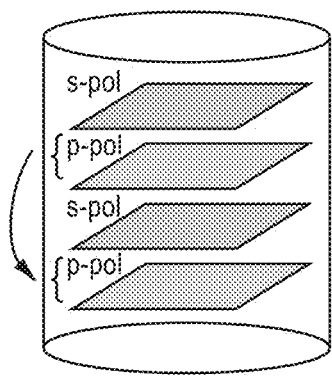
FIGS. 16A-16C illustrate different scanning paradigms achievable with the systems, apparatuses, and methods disclosed herein, according to embodiments.
Figure 16B:
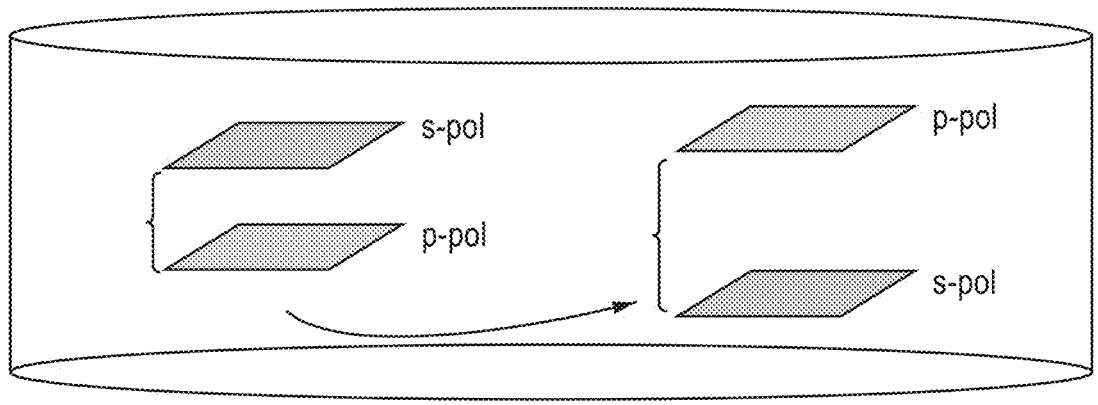
Figure 16C:
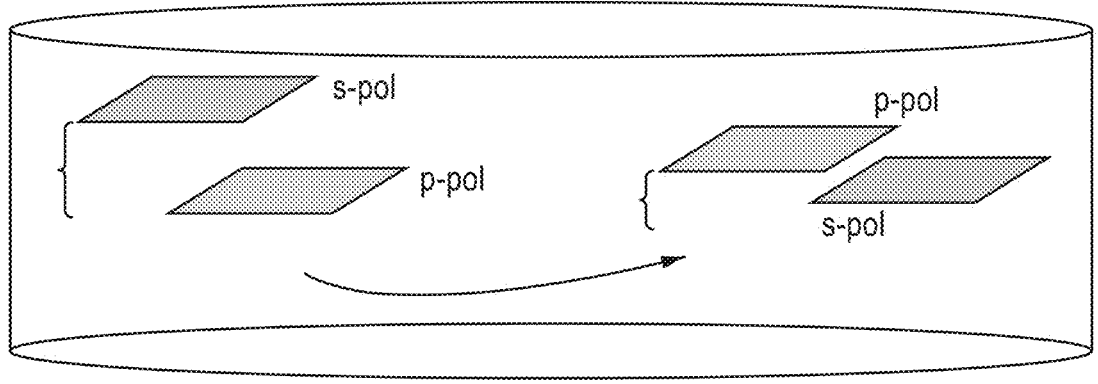

Having described various scanning techniques, FIGS. 16A-16C illustrate example scanning paradigms that are possible per the embodiments disclosed herein. FIG. 16A illustrates volumetric imaging in two-photon microscopy, employing a dual plane remote focusing unit as described herein. Each of the two excitation signals (s-polarized and p-polarized) can be focused on different planes, and then both moved to other planes. FIG. 16B illustrates simultaneous dual-plane imaging within a large volume, where each imaging plane has independent Z position/focal plane position but maintains XY range of positioning. FIG. 16C illustrates simultaneous dual-plane imaging within a large volume, where each imaging plane has independent Z and XY range of positioning.

Figure 17A:
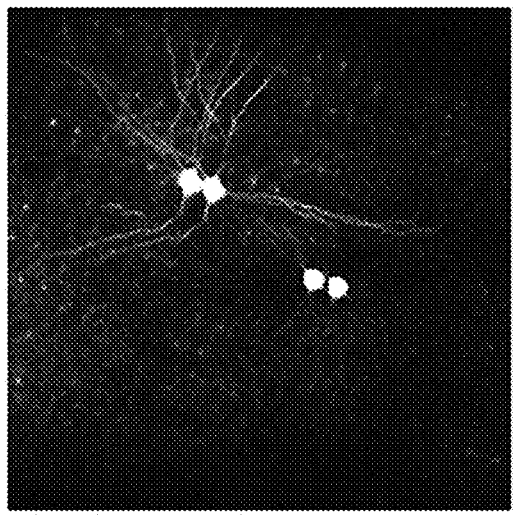
FIGS. 17A-17C illustrate images of examples of images of neurons in vivo acquired with excitation in the first (FIG. 17A), the second (FIG. 17B), and both imaging channels (FIG. 17C) simultaneously without signal demultiplexing. The two Z planes were deliberately offset in XY direction to illustrate the imaged dual features.
Figure 17B:
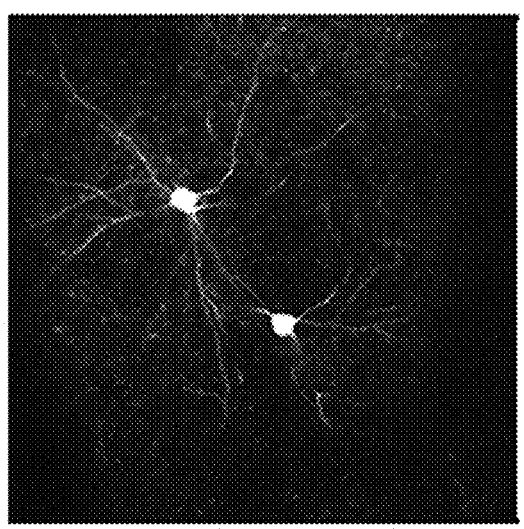
Figure 17C:
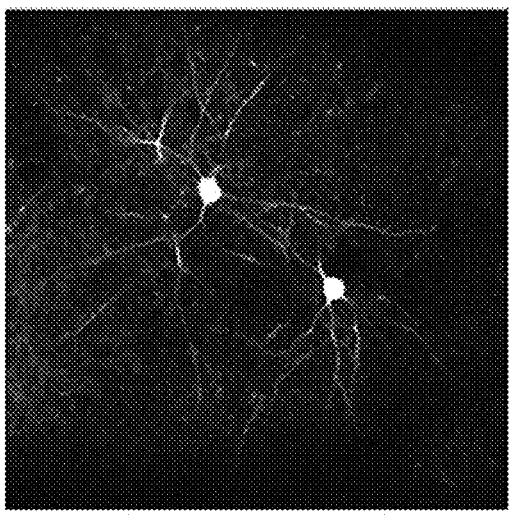

FIGS. 17A-17C are images of neurons in vivo acquired with the system of FIG. 10, with FIG. 17A being an image from a first channel, FIG. 17B being an image from a second channel, and FIG. 17C being a combined image from both imaging channels. The two Z planes were deliberately offset in XY direction to illustrate the imaged dual features.

Example 1

Two-photon laser scanning microscopy (TPLSM) has become a standard tool for in vivo functional recording of calcium signals. The advancement of novel mesoscopic imaging systems with a significantly larger field of view has provided access to nearly 100× larger volume for functional imaging and analysis and opened new frontiers for studying in vivo brain function and information exchange across multiple cortical areas. Due to frame rate limitations, researchers must find a balance between the size of an imaging area, the number of laterally positioned (ROIs), and the number of axial planes within ROIs, so that each plane can be imaged with a satisfactory temporal resolution. Faster TPLSM imaging methods are highly desired to further expand the scope of brain optophysiological studies. To address this desire, a variety of methods have been introduced in the recent years. Each of these approaches utilizes different forms of tradeoffs between resolution, useful signal amplitude, and permissible laser power input to achieve higher imaging throughput at the expense of decreased resolution, lower signal to noise (SNR), and the reduced imaging depth. For instance, imaging with Bessel beams maintains lateral resolution, deliberately sacrifices axial resolution to extend depth of field, and requires increase in laser power roughly proportional to the Bessel beam length to record fluorescence signals from individual cells with similar signal amplitude as in conventional TPLSM. Increased laser power input leads to higher background fluorescence especially when imaging deep in vivo, and, when combined with power adjustments to compensate for signal attenuation caused by light scattering, reaches biologically acceptable power level threshold at significantly smaller depths.

To address the ever-growing need for faster calcium imaging throughput multiplexed techniques that enable simultaneous multi-site recordings with multiple excitation beams and a single detector are emerging. These methods, however, can be considered as proof of principle demonstrations and require additional development before they are ready to be used in Neuroscience. Ideally, a TPLSM system should have large field of view to record information from multiple cortical areas, aberration correction mechanism and optimized collection efficiency to ensure efficient two-photon excitation and fluorescence signal detection, high scan speed as well as fast lateral and axial positioning mechanisms for moving imaging plane within optically accessible volume. The Multiphoton Mesoscope (MM), developed by Sofroniew et al. and commercialized by Thorlabs is currently the only commercial system that satisfies these requirements. The system utilizes the principles of remote focusing to achieve aberration-corrected two-photon imaging.

Disclosed herein is a modification to the MM system that effectively doubles its imaging throughput by adding a second imaging channel identical to the existing one. The added excitation path utilizes its own remote focusing unit responsible for axial positioning of the imaging plane and shares the lateral positioning optomechanics with the original beam. The principles of temporal division-multiplexing (TDM) are utilized to encode excitation laser pulse trains with a temporal delay and decode temporally-interleaved fluorescence signals from each channel based on their arrival time to the detector. As a result, simultaneous imaging from two focal planes independently positioned in the axial direction was achieved.

FIG. 10 illustrates the system 1000 that is employed. FIGS. 14A-14C illustrate the add-on module installed on the breadboard of the original MM system.

A detailed evaluation and comparison of the original MM and the modified dual-plane Multiphoton Mesoscope (MM2x) was performed by measuring the dynamic ranges and the noise levels in both systems, the cross-talk between imaging channels, the point spread function within different regions of imaging volume at different depths. To characterize the original MM system, the demultiplexing electronics was removed from the signal detection path, leaving only the current amplifier and the low-pass RF filter in place.

Temporally interleaved excitation pulses with a combined 160 MHz pulse rate create the corresponding sequence of interleaved fluorescence signal arising from different locations. The width of the temporal window that contains fluorescence signal from a single laser pulse equals 6.25 ns. Demultiplexing electronics should therefore have a sufficiently high bandwidth to sort these signals. While high bandwidth requirement is necessary, successful temporal demultiplexing also depends on the fluorescence lifetime of the dye in use. Fluorescence lifetime r of calcium indicators based on green fluorescence protein ranges between 2.7 and 3.2 ns. This lifetime is sufficiently long to make fluorescence signal extend into the next temporal window, thereby producing significant cross-talk between the imaging channels.

Figure 18A:
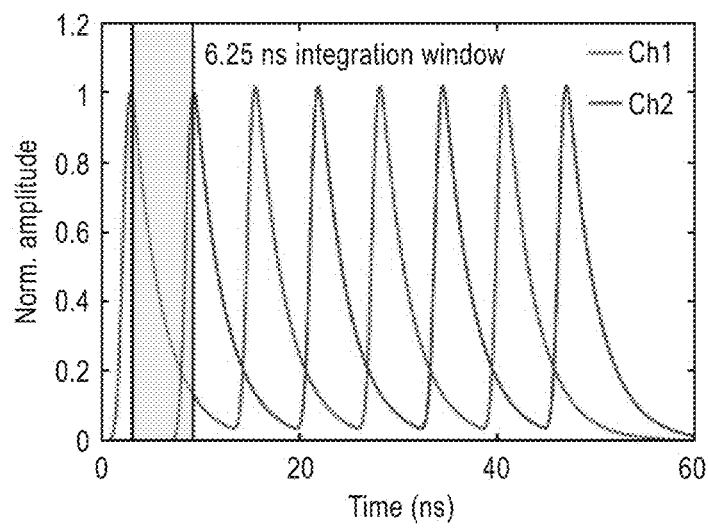
FIG. 18A illustrates simulated temporal profiles of fluorescence signals with the lifetime of 3 ns and a detector bandwidth of 400 MHz, resulting from pulsed excitation at the combined pulse rate of 160 MHz.
Figure 18B:
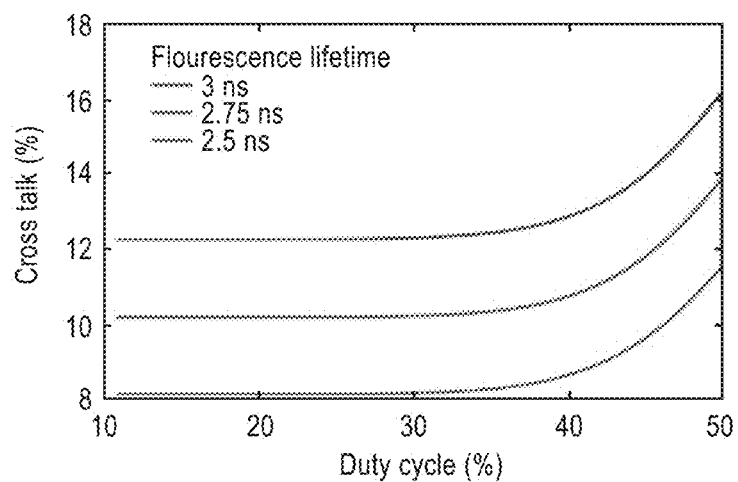
FIG. 18B illustrates computed cross-talk values between two-imaging channels as a function of temporal integration window width.
Figure 18C:
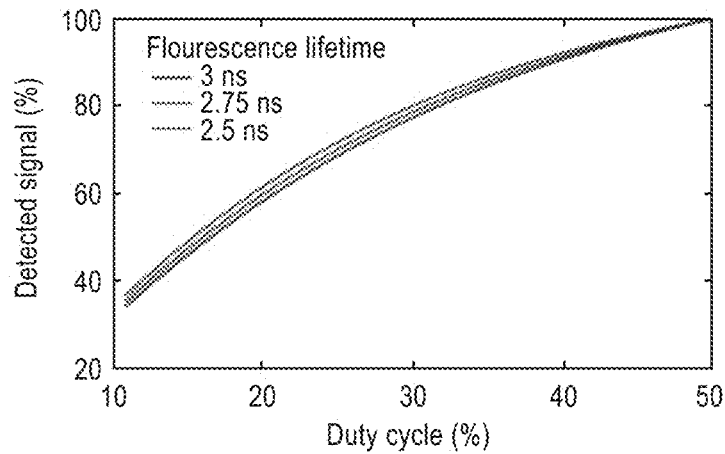
FIG. 18C illustrates fluorescence signal loss as a function of variable duty cycle relative to the fluorescence signal at 50% duty cycle.

To evaluate the expected cross-talk values, a numerical model was created where fluorescence signals are represented by the convolution of two Gaussian profiles with bandwidths of ~400 and ~500 MHz related to the instrument responses of a PMT and an amplifier, and an exponential decay signal defined by a fluorescence lifetime (FIG. 18A). Cross-talk between the first and the next temporal window was characterized as the minimum ratio of the signals integrated in these time intervals. Cross-talk reduction can be achieved by reducing the temporal window width, i.e. its duty cycle. FIG. 18B shows the computed cross-talk values for different fluorescence lifetimes as a function of duty cycle. For example, in case of r=3 ns and 50% duty cycle the estimated cross-talk value equals ~16%. Reducing the duty cycle reduces the cross-talk at the expense of losing part of a useful fluorescence signal, as shown in FIG. 18C. Noticeable cross-talk reduction occurs at duty cycle values between 40 and 50%. FIG. 18C illustrates signal loss relative to the integrated signal within 6.25 ns window, and does not account for additional 10-16% loss due to signals being extended beyond this temporal interval.

Figure 19A:
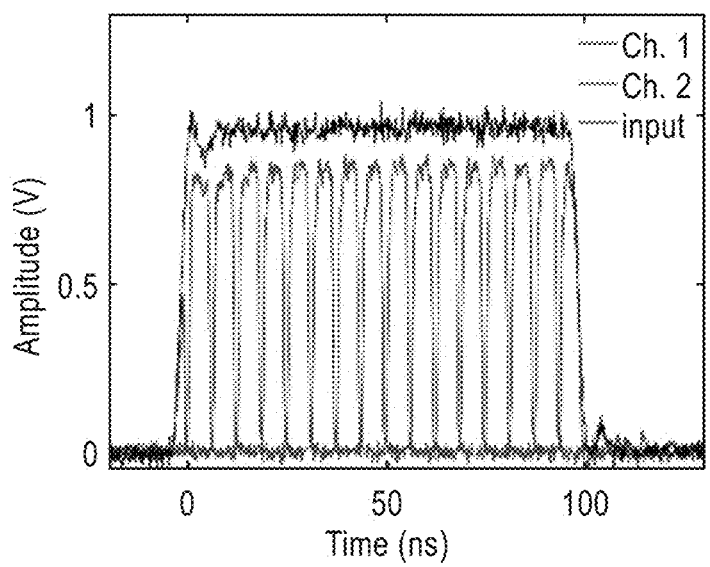
FIG. 19A illustrates an example demultiplexing electronics operation, with signals recorded at the input and outputs of the RF switch 1050 of FIG. 10.
Figure 19B:
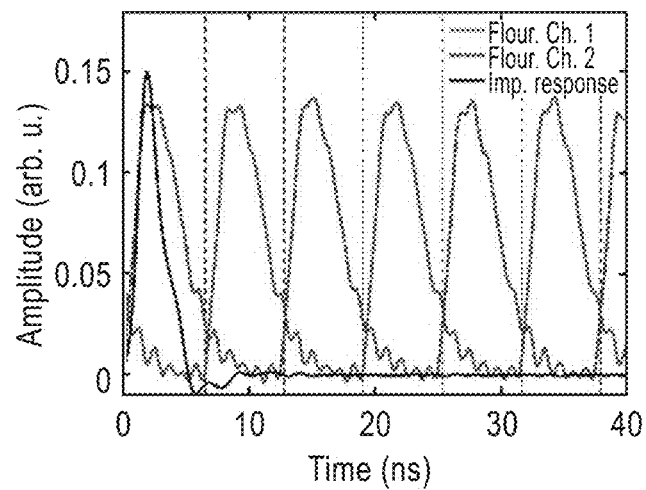
FIG. 19B illustrate a time-resolved impulse response signal from PMT and preamplifier, and the signals corresponding to GCaMP6f fluorescence in vivo.
Figure 19C:
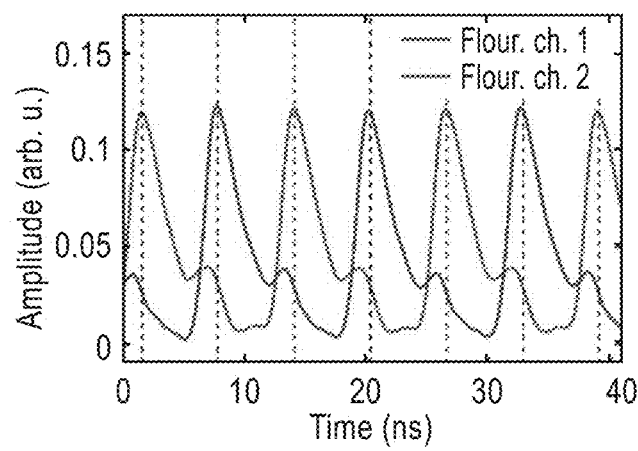
FIG. 19C illustrates time-resolved, averaged, fluorescence signals from pollen grain (PG) samples, stained with Fast Green CFC. The interval between vertical grid lines is 6.25 ns.

FIG. 19A demonstrates the operation of demultiplexing electronics. Here, an input square waveform with the step from 0 to 1 V and duration of 100 ns is toggled between two DAQ channels by control signals derived from the laser sync signal. The 10-90% rise/fall time of signals in FIG. 19A is about 0.6 ns. Both signals have the period of 12.5 ns and the duty cycle of about 39%. The amplitude of the output signal is attenuated by 1.6±0.2 dB, which is consistent with the manufacturer specified insertion loss. Examples of an averaged PMT signal corresponding to a single photon detection event and the measured time-resolved fluorescence signals of GCaMP6f-labeled cells and pollen grains (PGs) are shown in FIG. 19B, 19C. The impulse response trace in FIG. 19B shows the main peak with FWHM of ~2.5 ns as defined by the preamplifier bandwidth, as well as a smaller side lobe appearing due to the reflection of broadband pulses within PMT-preamplifier connection. The measured time-resolved fluorescence signal appears slightly broader than simulated traces in FIG. 18A, which may be caused by the increased width of the circuit's impulse response, electronic jitter during the measurement, and longer than 3 ns GCaMP6f fluorescence lifetime. Time-resolved fluorescence measurement of PG samples (FIG. 19C) was recorded prior to reducing the lead cable length from 45 cm to 5 cm, and the traces show more pronounced secondary peak caused by reflections, offset from the main peak by ~5 ns.

Figure 20A:
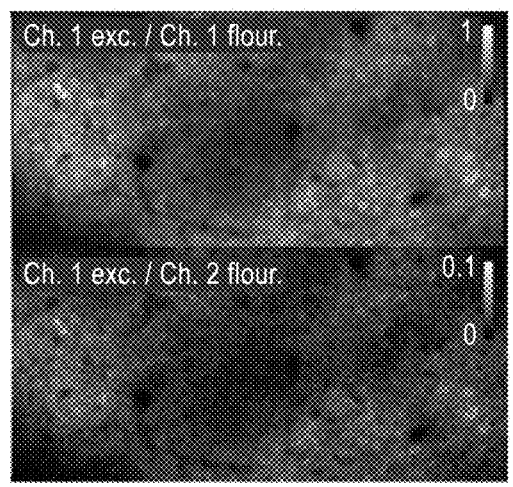
FIG. 20A illustrates averaged in vivo images of a mouse cortex in two imaging channels recorded simultaneously using excitation in the first channel only.
Figure 20B:
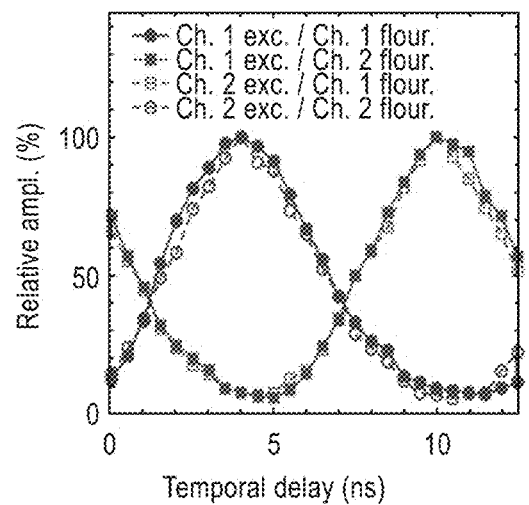
FIGS. 20B and 20C illustrate comparisons of the normalized average emission intensities in two imaging channels as a function of temporal delay. The profile in FIG. 20B corresponds to fluorescence signals of neurons labeled with GCaMP6f, and the profile in FIG. 20C corresponds to fluorescence signals of neurons labeled with stained PGs.
Figure 20C:
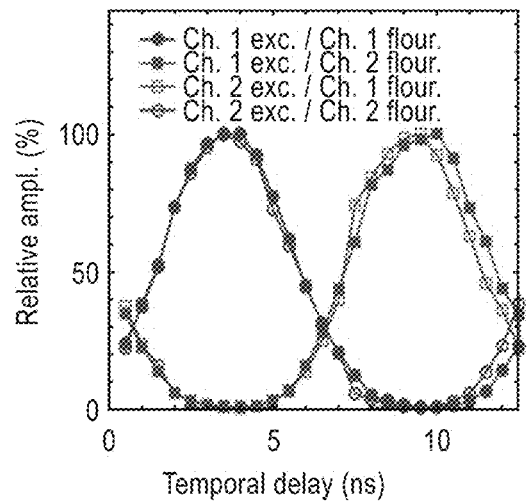
Figures 21A, 21B:
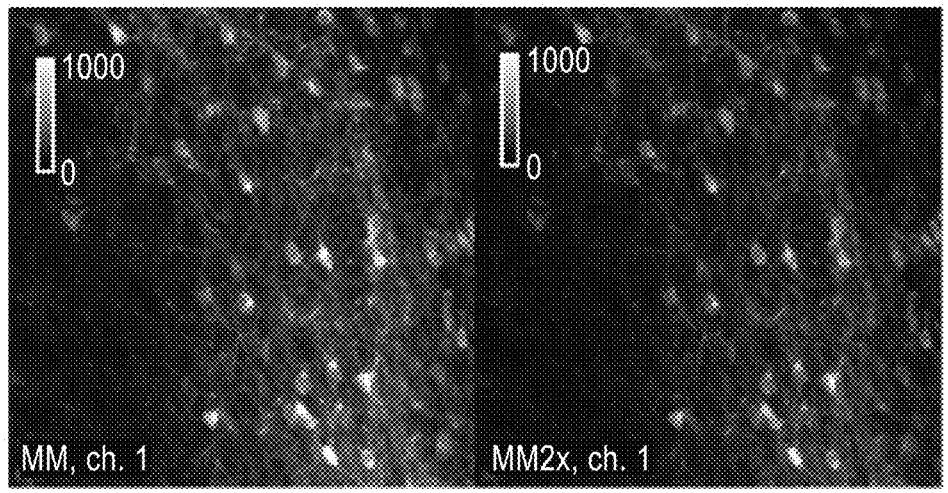
FIGS. 21A-21D illustrate two-photon images of a GCaMP6f-labeled tissue slice recorded with a Multiphoton Mesoscope ("MM") system from Thorlabs and with the modified double-plane system ("MM2x") of FIG. 10, averaged 400 times. Images recorded in channel 1 and channel 2 were recorded at the excitation power level of 70 mW and 82 mW, respectively.
Figures 21C, 21D:
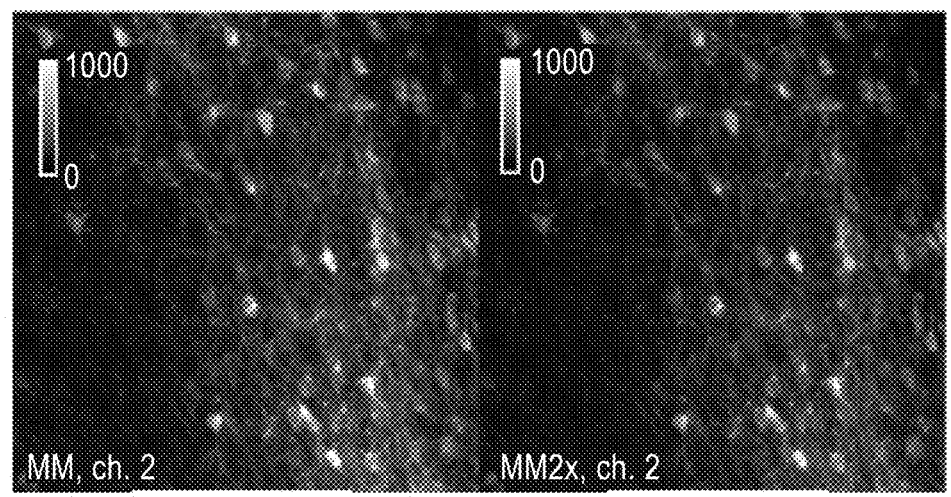

Cross-talk between imaging channels was measured by recording signals from test samples using excitation in a single channel and recording the emission signals in both channels. Fluorescence cross-talk values were also evaluated as a function of temporal delay using in vivo images of a mouse brain and a sample of stained pollen grains (PGs) (Carolina) (see FIGS. 20A-20C). Notably, PG samples exhibited much shorter fluorescence lifetime as compared to GCaMP6f. FIG. 20A shows in vivo images of a mouse cortex in both channels recorded with excitation present in the first channel and averaged 1000 times. Normalized fluorescence intensity profiles corresponding to the average signal in a selected area within images of a mouse and a PG recorded at different temporal delays are shown in FIGS. 20B, 20C respectively. The cross-talk values between imaging channels are different and appear at the level of about 7% and 1% in brain tissue and PG images, respectively.

Figure 22A:
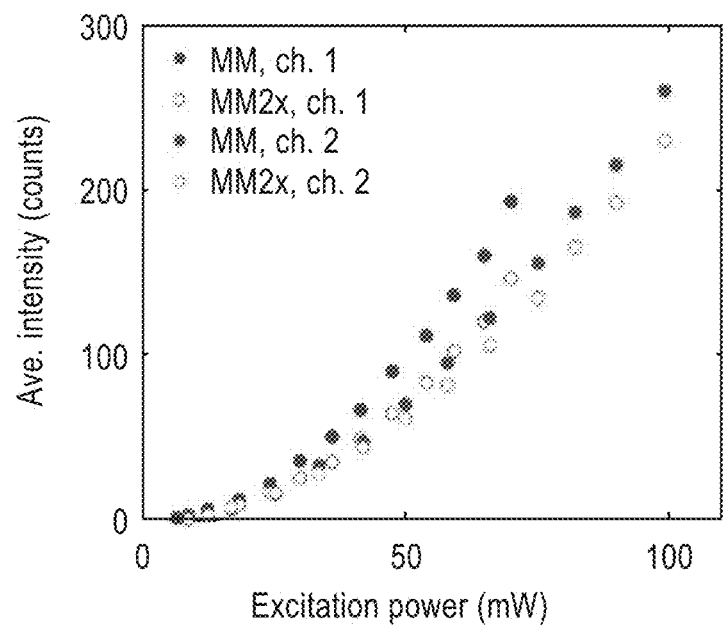
FIG. 22A illustrates average fluorescence signals of selected regions of interest (ROIs) within a cell body outlined with the red lines in FIGS. 21A-21D, recorded in the same experimental conditions with both imaging systems (MM, MM2x) at different excitation power levels.
Figure 22B:
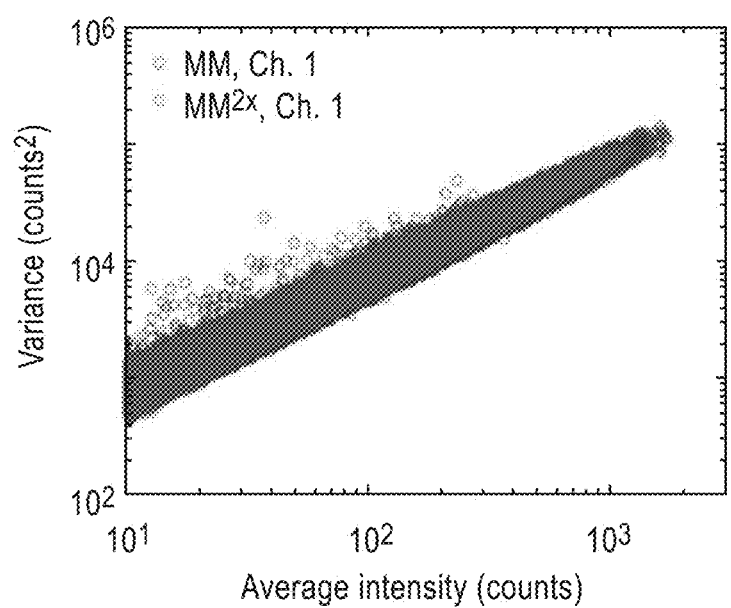
FIG. 22B is a mean-variance plot computed from the images in FIGS. 21A and 21B.

An example demonstrating the quantitative similarity between two imaging systems is shown in FIGS. 21A-21D. Two-photon images of the GCaMP6f-labeled brain tissue slice were recorded with MM and MM2x, using either channel 1 or channel 2 excitation pathways. Absolute intensity values appear slightly attenuated in the images recorded with the multiplexed system as compared to the original MM. Average intensity values were computed from 400 images acquired at different excitation intensities, as well as average intensities within selected ROI shown in FIGS. 21A-21D. The results are presented in in FIGS. 22A, 22B. Mean-variance plots computed from the corresponding images are shown in FIG. 22B. Nearly the same noise levels was observed in both imaging systems.

Because of GCaMP6f photobleaching at high excitation intensities, it can be challenging to evaluate and compare full dynamic range of two imaging systems using this fluorophore. For this purpose, brighter and more photostable fluorescence samples were used. Similar set of experiments was performed using PGs, when their images were recorded at different excitation power levels. An example of the acquired images is presented in FIG. 23A. FIG. 23B shows the fluorescence intensity dependence on the input power of the selected PG. A quantitative similarity of signals from MM and MM2x at intensity levels below 4000 counts was observed. Fluorescence signals in MM2 show clear signs of saturation above this level. Hence, the dynamic range of the MM2x appears to be 50% less as compared to MM. The corresponding mean-variance plots computed from these images are presented in FIG. 23C, presenting the data from channel 1. Nearly identical signal to noise relationship in both imaging systems below signal saturation limits was observed.

Point spread function (PSF) measurements were performed across imaging volume by acquiring the z-stacks of 200 nm fluorescence beads immobilized in an aqueous gel matrix at different imaging depths from 0 to 500 µm, and different regions in the system's field of view. Examples of PSFs from two imaging channels, recorded at the depth of 300 µm, are shown in FIGS. 24A, 24B. The position of the point inside the gray circle indicates the location in the field of view where PSF was measured. False color images show projections of a volumetric PSF onto a single plane (XY, XZ, YZ). Line plots show the cross-section of the corresponding projections. A complete list of measured PSF values is provided in Table 1. Overall nearly identical PSF values were observed in both imaging channels.

TABLE 1

Point-spread function characterization of the MM2x system across the imaging volume.

| | Ch. 1/Ch. 2 axial PSF, µm | | | | | Ch. 1/Ch. 2 lateral PSF, µm | | | | |
|---|---|---|---|---|---|---|---|---|---|---|
| Depth, µm | left | center | right | top | bottom | left | center | right | upper | lower |
| 0 | 4.3/5.8 | 5.0/5.8 | 4.0/4.8 | 4.6/5.7 | 4.0/6.0 | 0.7/0.7 | 0.7/0.7 | 0.7/0.7 | 0.7/0.7 | 0.7/0.7 |
| 100 | 4.0/5.8 | 4.3/6.9 | 3.6/5.7 | 4.6/5.2 | 4.5/5.8 | 0.7/0.8 | 0.7/0.7 | 0.7/0.8 | 0.7/0.7 | 0.7/0.8 |
| 200 | 3.7/4.4 | 4.6/3.8 | 3.7/3.4 | 4.0/4.0 | 4.5/4.7 | 0.7/0.7 | 0.7/0.7 | 0.7/0.7 | 0.8/0.7 | 0.7/0.7 |
| 300 | 4.0/3.7 | 3.5/3.3 | 3.8/3.3 | 3.9/4.3 | 3.8/3.5 | 0.9/0.8 | 0.7/0.7 | 0.7/0.7 | 0.7/0.7 | 0.7/0.7 |
| 400 | 4.4/5.0 | 4.1/4.0 | 4.0/4.3 | 4.6/4.3 | 3.7/4.5 | 0.9/0.8 | 0.7/0.7 | 0.7/0.7 | 0.8/0.7 | 0.8/0.8 |
| 500 | 4.8/5.0 | 4.5/4.3 | 4.5/4.9 | 4.7/3.7 | 3.9/4.7 | 0.9/0.8 | 0.8/0.8 | 0.7/0.8 | 0.8/0.7 | 0.9/0.8 |

Even though two-photon temporal division-multiplexing method has been demonstrated years ago, this method has not evolved to the level of commercial instrumentation. Up to date, only a few research groups in two-photon imaging community implemented this approach in their own experimental setups. Particularly, demultiplexing of temporally-interleaved high-bandwidth PMT signals at rates above 100 MHz is technologically challenging. There are two issues that should be resolved to enable this imaging technology. First is the synchronization of the detection electronics with the laser repetition rate which is critical for the correct assignment of signals to the imaging channels. Since laser pulse rate depends on the resonator path length, any path length change, for example, due to changes in ambient temperature, will shift the pulse rate frequency. One may recall that any periodic sequence of time series signals of arbitrary shape is represented by a discrete set of frequencies centered around the main frequency. Thus, it is possible to isolate the main frequency component using an appropriate RF filter centered at 80 MHz, and convert the resulting sine wave into a square waveform, or complementary square waveforms using an RF comparator circuit (FIG. 10).

The second and the most challenging problem is demultiplexing. Electrical signals at the PMT output corresponding to in vivo calcium signals exhibit large diversity, ranging from isolated high-bandwidth spikes arising from individual photon detection events to significantly higher and longer bursts of signals from high photon fluxes. Overall, the dynamic range of digitized signals spans more 4 orders of magnitude. The resulting requirements for the demultiplexing electronics in terms of detection sensitivity, detection bandwidth, and dynamic range are difficult to meet. Published reports each describe their own demultiplexing method. The detailed comparison with the conventional TPLSM measured in identical experimental conditions was typically not provided, so it remains unclear to what extent the performance of the imaging system is affected by demultiplexing electronics. An initial demultiplexing scheme was based on a custom circuit which utilized the same analog multiplier ADL5391 (Analog Devices). While this approach achieved demultiplexing (data not shown), this solution had more than 5-fold increase in the background noise due to the presence of additional amplification stages and significant background shifts caused by high-amplitude low-bandwidth signals. The demultiplexing circuit of FIG. 10 is based on a fast RF switch with manufacturer specified switching time of 1.8 ns. While it is recommended to apply control voltages from 0 to −5 V, it may be possible to achieve much faster switching dynamics by slightly shifting the complementary 80 MHz square RF signals controlling the switch operation towards positive voltages. It was observed that a lag time of about 1 ns that follows the stepwise change in the control signals, which resulted in the reduced duty cycle of the signal integration window, as shown in FIG. 19A.

The bandwidth of the detection electronics and the temporal profile of a dye fluorescence affect the width of the averaged signal, how much of it fits within current window, and how much of it leaks into the next temporal window. For example, as FIGS. 19A-19C, 20A-20C demonstrate the cross-talk for PG samples is significantly smaller that GCaMP6f labeled samples due to differences in their respective fluorescence lifetimes. Interestingly, the measured cross-talk value of ~8% for GCaMP6f is noticeably less than predicted by numerical analysis in FIG. 18. Note that the impulse response of the detection system (FIG. 19B) has a small undershoot which likely reduces the amplitude of the fluorescence signal that extends into the next temporal window.

One useful parameter is fraction of a useful signal lost in the multiplexed imaging system. The bandwidth of the detection electronics and fluorescence lifetime of a dye affect the temporal width of fluorescence signals, how much of it fits within measurement interval, and how much of it leaks into the next temporal window. The TDM system disclosed herein can, in some embodiments, favor samples with shorter florescence lifetimes, resulting in a reduced cross-talk and smaller losses of useful signal. One to one comparison of the fluorescence signals from PG samples imaged with MM and MM2x shown in FIGS. 23A-23B demonstrates that the performance of both systems is nearly identical, albeit within certain limits before signal saturation effects take place. Similar comparison of fluorescence signals from GCaMP6f-labeled samples in FIGS. 21A-21D and FIGS. 22A-22B shows up to 24% reduction of signal amplitude in the modified system, respectively. Such signal loss is expected since the average GCaMP6f fluorescence signal does not fit into 4.9 ns temporal interval, as shown in FIG. 19A, 19B. Using the data from FIGS. 19A, 19B, it is estimated that ~17% of the total GCaMP6f fluorescence signal appears outside of the temporal window, and ~5% appears in the next one. These estimates agree well with experimentally observed cross-talk values in FIGS. 26A-26C. Direct comparison of fluorescence signals from FIG. 22A showed 24% signal loss. Part of it can be attributed to the insertion loss of the demultiplexing electronics, which only changes the system's amplification factor (or system conversion gain) and does not affect the number of photons detected.

Mean-variance plots in FIGS. 22D, 23C corresponding to MM and MM2x systems appear closely matched before signal saturation effects takes place, suggesting identical noise levels in both imaging systems. Linear slopes of mean-variance plots computed from GCaMP6f-labeled images recorded with MM and MM2x in both imaging channels equal 70±2 counts, which is within ±3% of their average value.

The signal saturation in MM that appears near 8000 counts (~$2^{13}$) (FIG. 21A) is caused by 14-bit DAQ electronics which has the limited input voltage range of ±1V. Note that the signal reference level is currently set at 0 V. Therefore, the signals appearing at the DAQ input should have amplitude <1V to avoid non-linearity in the recorded signals. Peak voltages in amplified PMT signals at the given PMT gain setting routinely exceed 1 V, and the use of low-pass filter is essential for matching the signals to the DAQ digitization window and the digitization rate. With a demultiplexing circuit in place, the signal saturation occurs at approximately 4000 counts, which corresponds to 50% reduction in the detection dynamic range. In test experiments, we observed that the RF switch progressively attenuates passing signals and limits their amplitude to ±2 V. These voltage levels appear near or above operating limits of both the preamplifier and the switch. Since the switch operation is identical at positive and negative signal polarity, it is possible to extend the dynamic range by introducing a DC offset to the preamplifier output and measuring the signals with respect to a new reference.

Example 2

Recently developed and commercialized Multiphoton Mesoscope (MM) enabled calcium imaging within an ultra-large field of view of ~5 mm in diameter. Due to limited scanning rate in two-photon microscopy, only few selected regions of interest can be images with an adequate frame rate. Researchers must find a balance between the size of the imaging area and the number of regions of interest within an optically accessible imaging volume to achieve a satisfactory temporal resolution of 8-10 Hz for recording transient calcium signals. FIG. 10 illustrates a modification of the MM system that effectively doubles its imaging throughput. The methods of temporal division-multiplexing and remote focusing are employed to enable simultaneous image acquisition from two focal planes independently positioned in the axial direction.

Figure 26A:
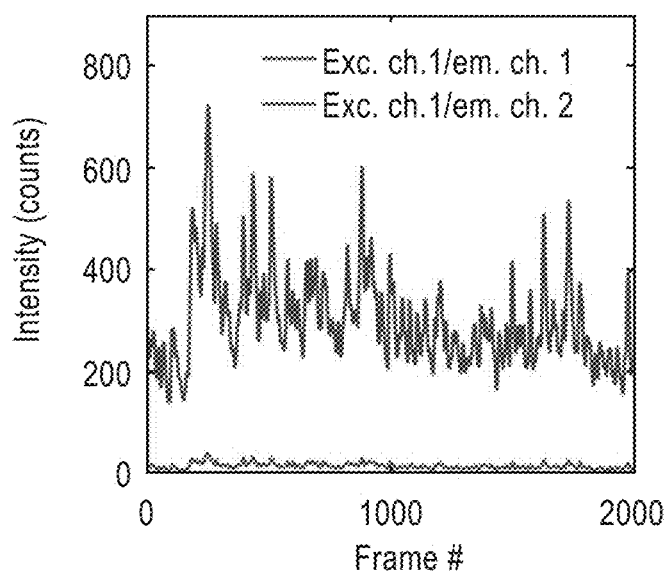
Figure 26B:
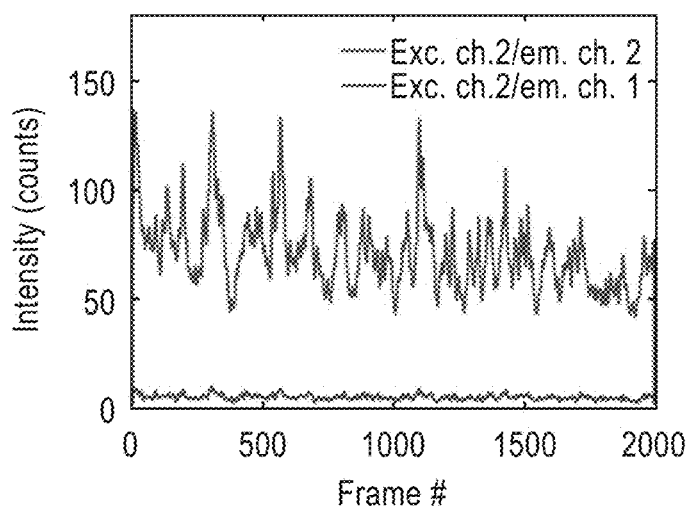
Figure 26C:
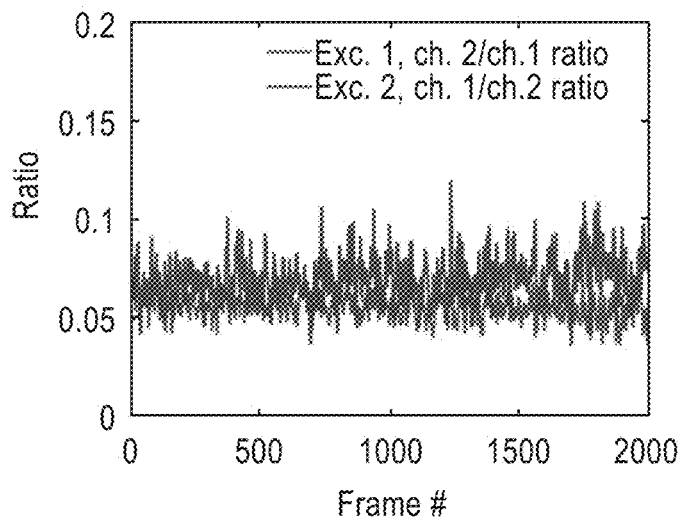
Figure 28A:
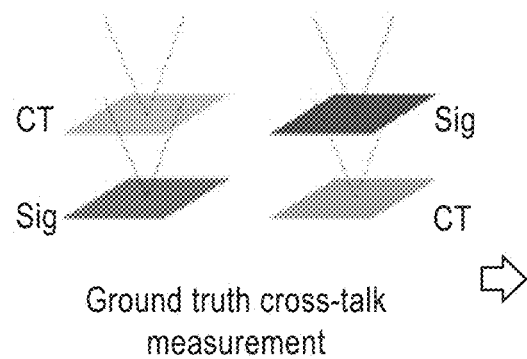
FIGS. 28A-28D illustrate an example workflow for crosstalk unmixing. Specifically.
Figure 28B:
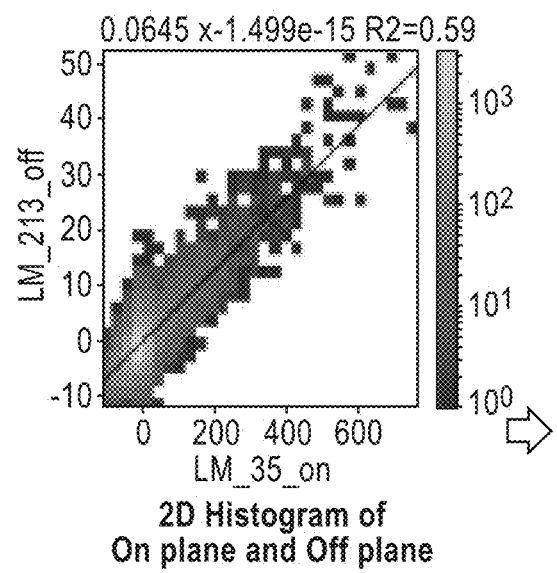
Figure 28C:
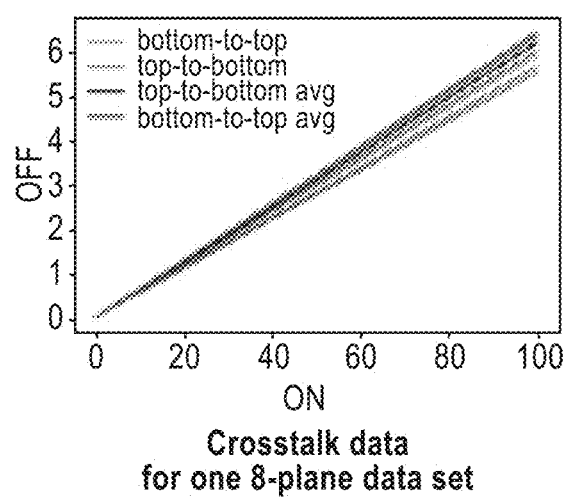
Figure 28D:
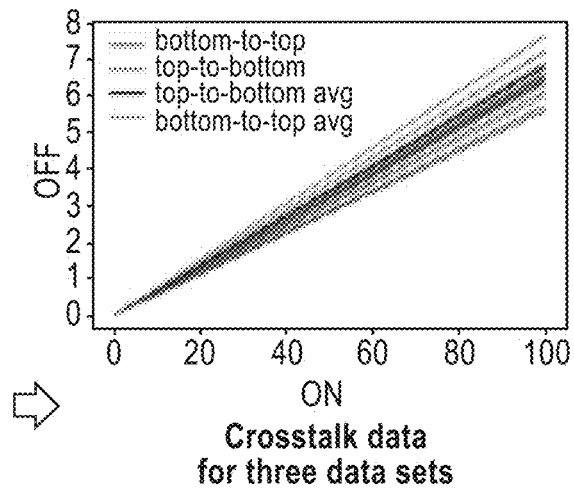

FIGS. 25A-25D, 26A-26C illustrate cross-talk in functional calcium signal recordings. Specifically, FIGS. 25A, 25B and FIGS. 25C, 25D show pairs of motion-corrected and averaged images from two channels of mouse brain tissue recorded simultaneously at depths of ~200 and ~300 μm while exciting the samples only in the first or the second channel. Thus, each set of images shows fluorescence signals from cells in the plane of interest, and ghost images of the same cells appearing due to the presence of cross-talk. Pixel intensities in the ghost images in FIGS. 21A-21D are multiplied by 10. Calcium signals were extracted from selected cells to demonstrate their relative intensities in both imaging channels (FIGS. 26A, 26B). FIG. 26C shows cross-talk values computed as ratio of the measured calcium signals in FIGS. 26A, 26B. The average cross-talk values computed from traces in FIG. 26C are $(5.6\pm0.7)\cdot10^{-2}$ and $(7.0\pm1.1)\cdot10^{-2}$ for Ch. 1→Ch. 2 and Ch. 2→Ch. 1, respectively. Due to the stochastic nature of the fluorescence fluctuations in the cross-talk values will occur from frame to frame.

Example 3

Several canonical cortical circuit models propose the interaction between two full cortical columns as one possible elementary unit of sensory processing. In particular, the dynamic interplay of bottom-up and top-down circuits across two connected cortical columns plays a key role in how sensory information is processed. Two-photon laser scanning microscopy (2P-LSM) allows for recording of neural activity in the mammalian brain using fluorescent calcium indicators of neuronal activity. Recent advances in 2P-LSM have increased the imaging field-of-view (FoV) from ~0.4×0.4 mm$^2$ to ~5×5 mm$^2$ and now support random positioning of multiple regions-of-interest (RoIs) within this large FoV. Still, simultaneously recording the flow of neuronal activity across two interconnected cortical columns has been limited to a small subset of pairs of cortical layers. Presented in FIG. 10 is an advanced microscopy system which combines two-photon random-access mesoscopy (2P-RAM) with dual-plane remote focusing, extending the number of simultaneously recorded RoIs and achieving imaging of multiple layers of two cortical columns at frame rates of up to ~11 Hz. PMT and de-multiplexed using custom electronics. Demonstrated herein is in vivo imaging in two cortical columns located in the mouse primary visual cortex (V1) and other higher visual areas (VAs) with image planes located at different cortical layers. FIG. 27 illustrates two possible imaging scenarios allowing for an optimal frame rate—imaging of 4 axially separated planes in two lateral areas (V1 and LM), and imaging of two axially separated planes in four lateral locations (V1, LM, AM, AL).

FIGS. 28A-28D illustrates an example workflow for un-mixing of cross-talk. Specifically, ground-truth data was measured by scanning with a single beam while acquiring data on both channels. A 2D histogram of signal vs. crosstalk was plotted, and a linear fit was computed (see FIG. 28B). The slope of the fit shows a percentage of how much signal leaked from the scanned plane into the non-scanned plane (crosstalk). A mixing matrix was constructed from two slopes and their compliments and was applied to the mixed data in order to separate signal from crosstalk.

Figure 29A:
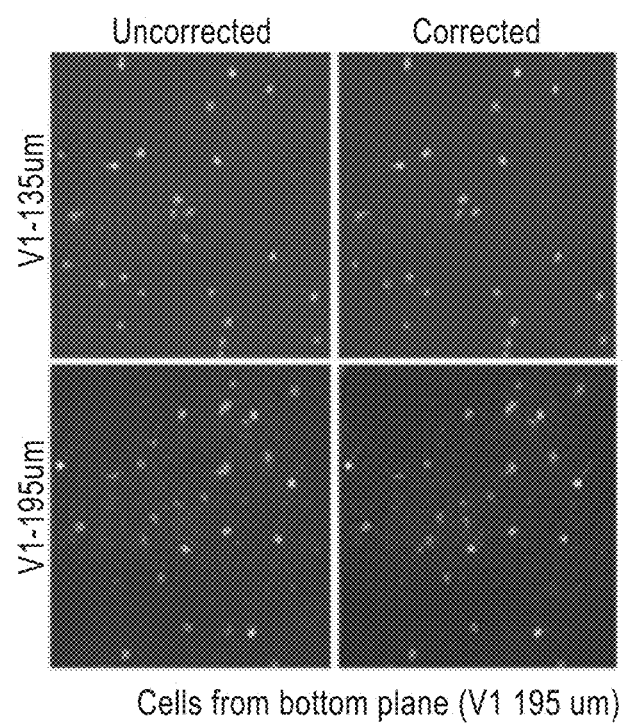
FIGS. 29A and 29B illustrate results of crosstalk unmixing.
Figure 29B:
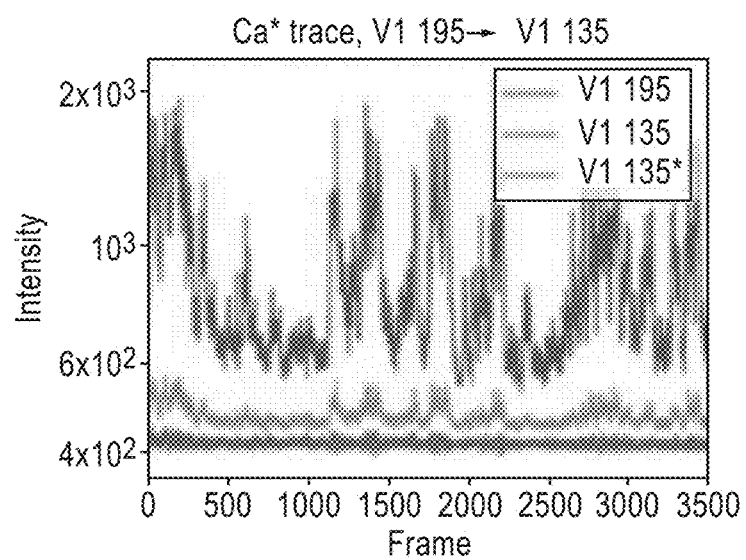
Figure 32A:
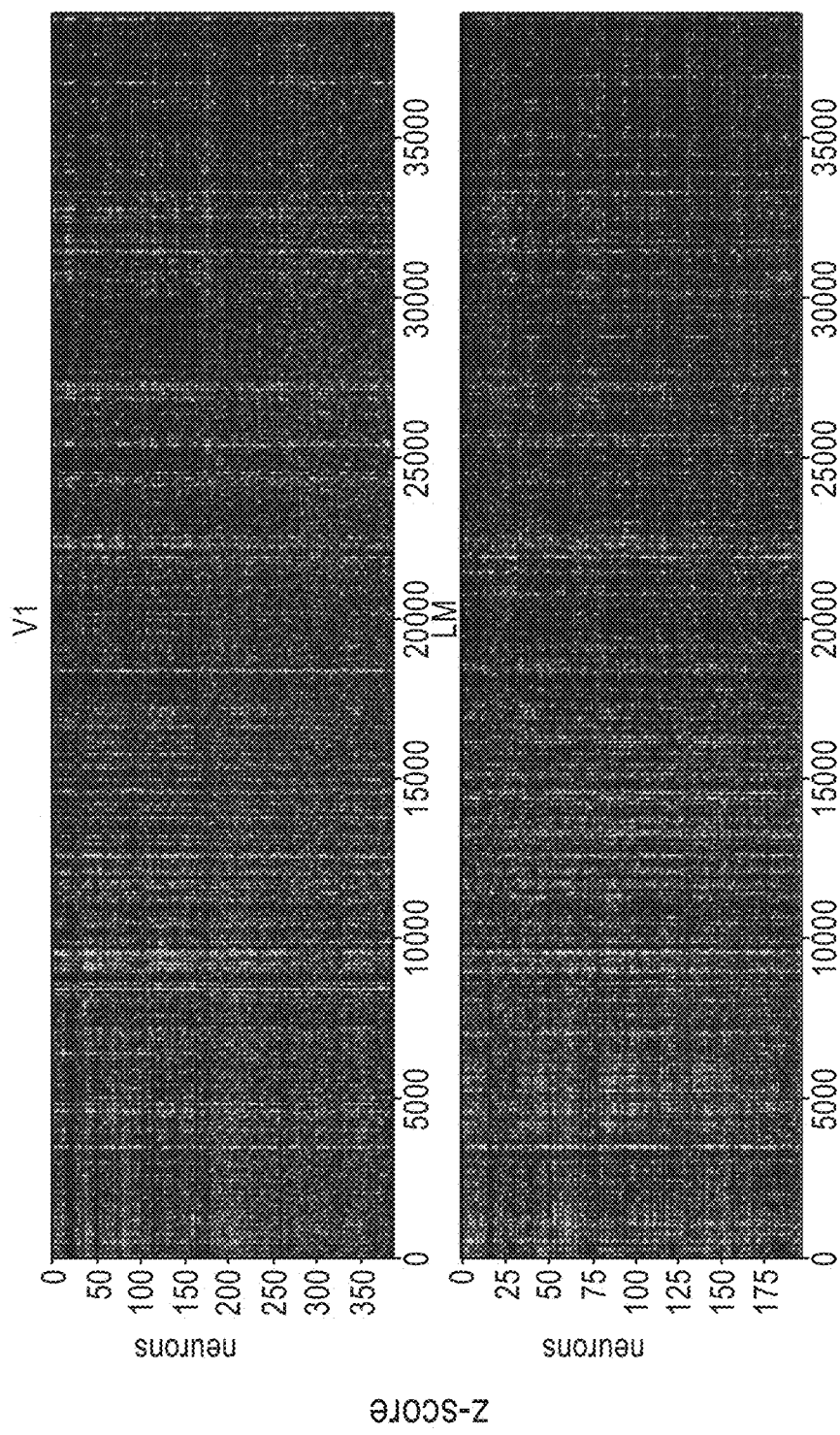
FIGS. 32A-32D illustrate correlations across two cortical columns.
Figure 32B:
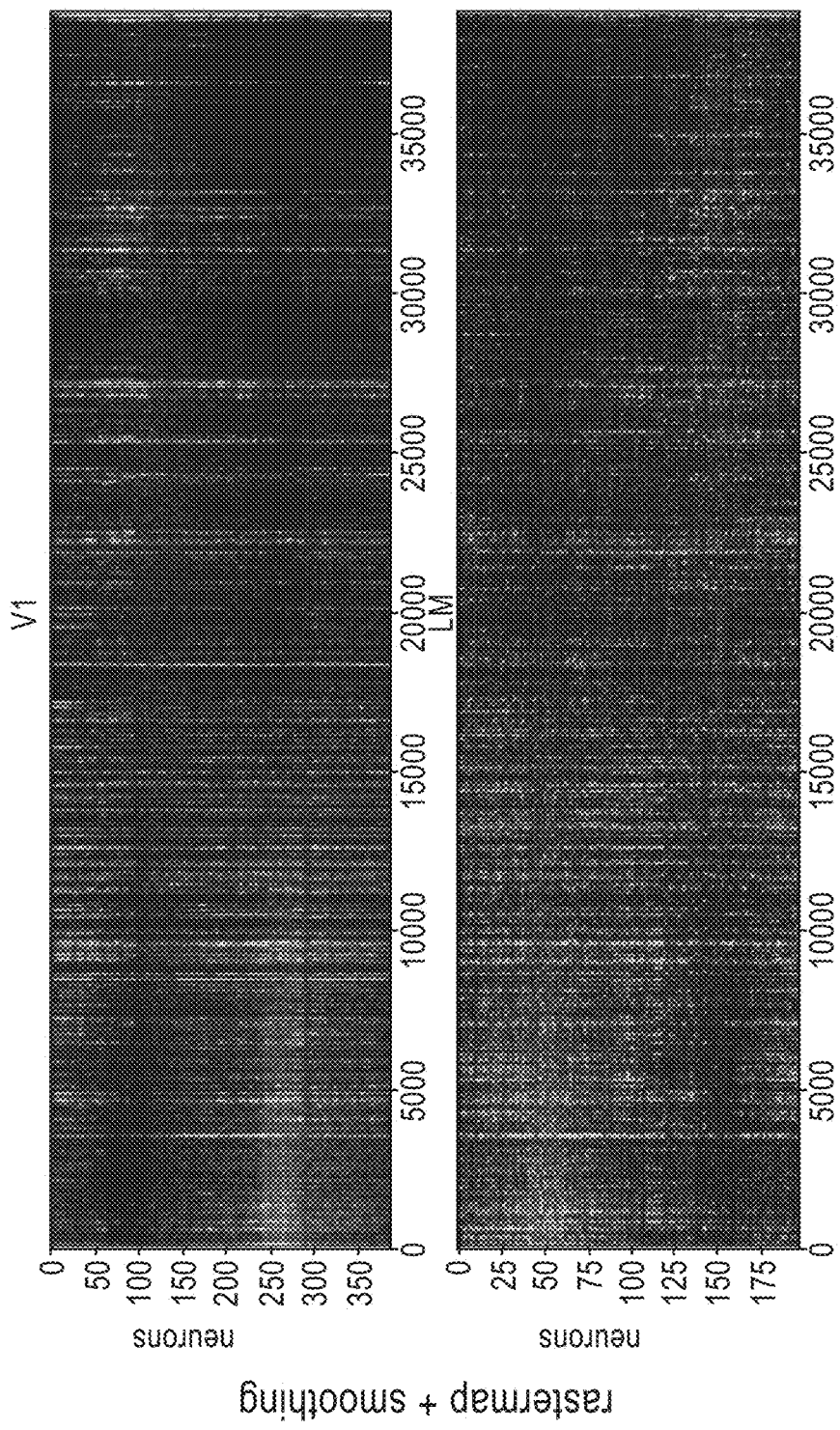
Figure 32C:
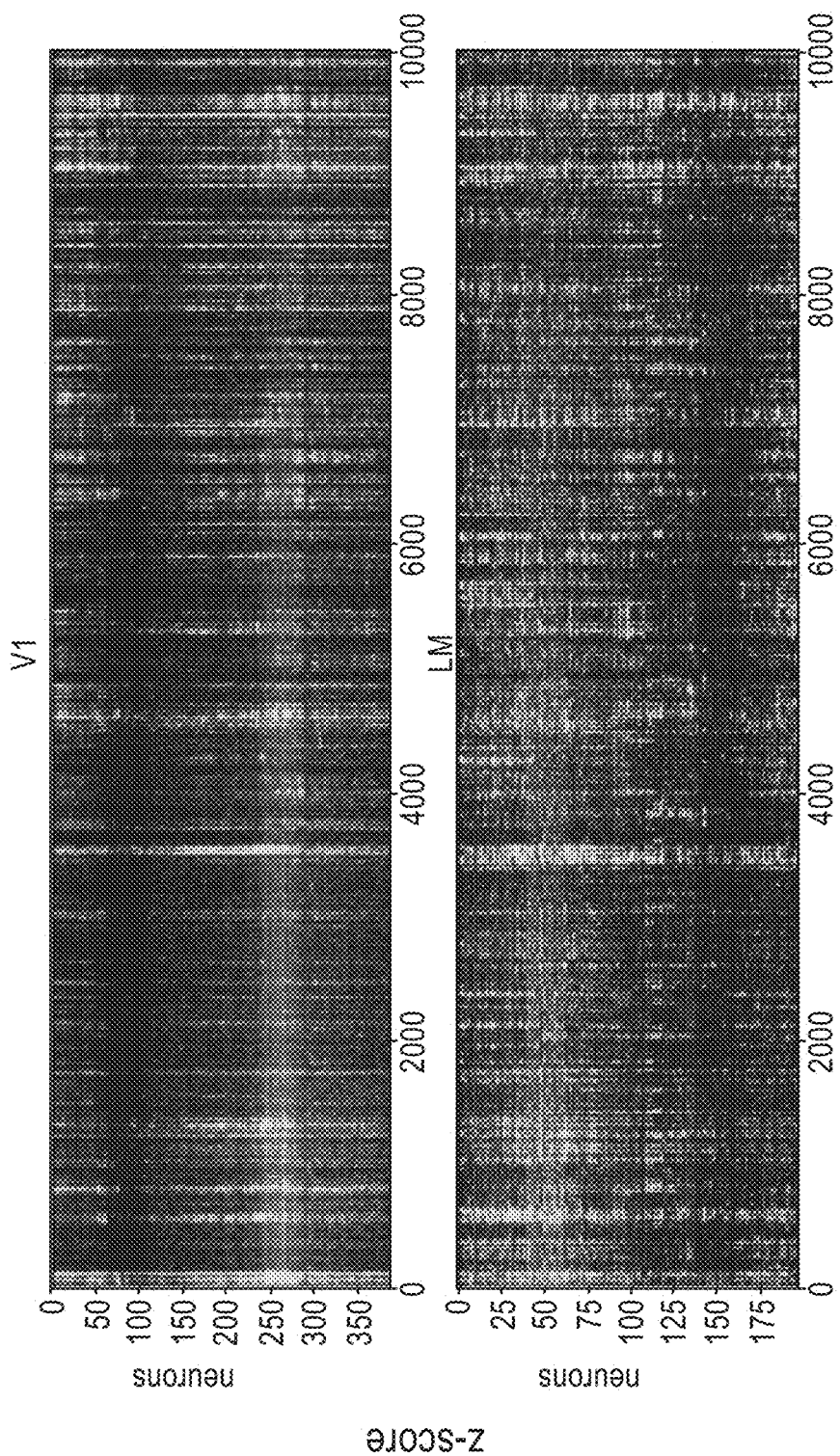
Figure 32D:
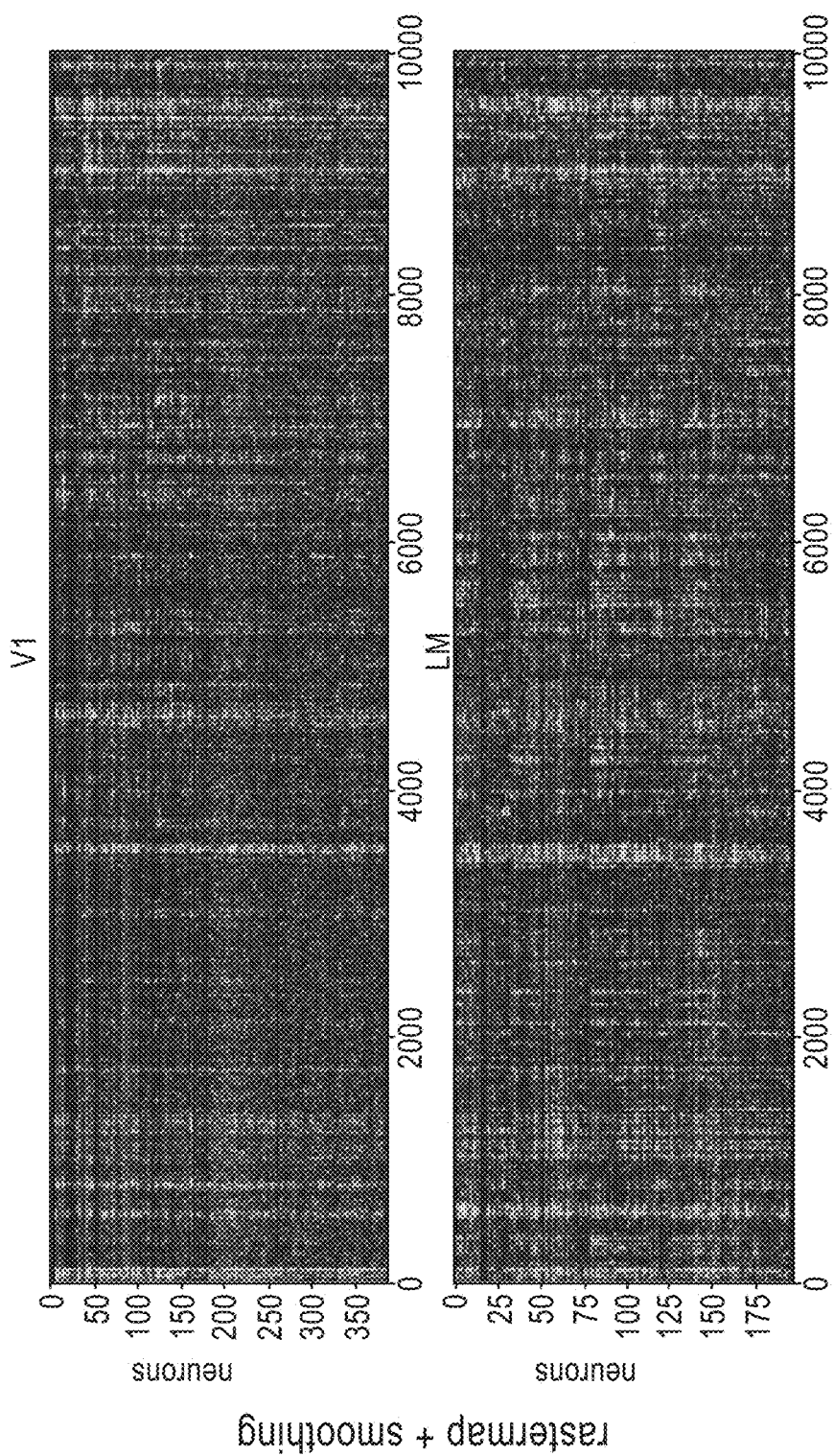

FIGS. 29A, 29B illustrate results of crosstalk demixing. Arrows in FIG. 29A indicate signal from cells that leaked into wrong channel. Shown herein is imaging data before and after demixing, and illustrates that leakage disappears after demixing. FIG. 29B shows calcium traces in signal plane (blue), crosstalk plane (orange) and cross-talk plane after demixing (green).

FIGS. 30A, 30B illustrates in vivo imaging of two cortical columns. Simultaneous imaging of 8 planes at 11 Hz in V1 (FIG. 30A) and LM (FIG. 30B) at 75 μm, 175 μm, 275 μm and 375 μm depths of a Slc17a7;Ai93 mouse. FoV is 400×400 μm$^2$ was carried out, matched to standard size of AI Brain Observatory datasets. LUT adjusted to optimize contrast at different depths. Frames are time-averaged by a factor of 8.

FIGS. 31A-31D illustrate in vivo imaging of four cortical areas. Vip-IRES-Cre;Ai148 mouse was imaged in visual cortex in V1 (FIG. 31A), LM (FIG. 31B), AL (FIG. 31C) and AM (FIG. 31D) at two depths: 75 μm and 190 μm. Frame rate is 11 Hz, FOV 400×400 μm$^2$. Each frame's LUT is adjusted to optimize contrast.

FIGS. 32A-32D illustrate correlations across two cortical columns. Vip-IRES-Cre;Ai148 mouse was imaged in visual cortex in V1 and LM at four depths: 75 μm, 175 μm, 275 μm and 325 μm. Around 1200 cells were recorded and analyzed (400 in V1, 200 in LM). Many cells show correlations similar to single-plane recordings.

Dual beam two-photon mesoscope system allows for simultaneous imaging in two cortical columns. Demonstrated herein is imaging in Vip and Slc mice in 4 visual areas at 2 axial locations, and in 2 visual areas in 4 axial locations. Performance was compared in terms of system gain of original and dual-plane 2P-RAM. Crosstalk was also evaluated for GCaMP6 labeled tissue showing to be less than 10%. The system is integrated with behavior apparatus and allows for neural activity tracking during active.

Each of the following references is incorporated herein by reference in their entirety.

W. Denk, J. H. Strickler, and W. W. Webb, Science 248, 73-76 (1990).
J. N. Stirman, I. T. Smith, M. W. Kudenov, and S. L. Smith, Nat. Biotechnol. 34, 857-862 (2016).
N. J. Sofroniew, D. Flickinger, J. King, and K. Svoboda, eLife 5, e14472 (2016).
N. Ji, J. Freeman, and S. L. Smith, Nat. Neurosci. 19, 1154-1164 (2016).
A. Cheng, J. T. Goncalves, P. Golshani, K. Arisaka, and C. Portera-Cailliau, Nat. Methods 8, 139-142 (2011).
J. L. Chen, F. F. Voigt, M. Javadzadeh, R. Krueppel, and F. Helmchen, eLife 5, e14679-14671-14626 (2016).
M. Ducros, Y. G. Houssen, J. Bradley, V. deSars, and S. Charpak, Proc. Natl. Acad. Sci. U.S.A. 110, 13138-13143 (2013).
W. Yang, K. J. Miller, L. Carillo-Reid, E. Pnevmatikakis, L. Paninski, R. Yuste, and D. S. Peterka, Neuron 89, 269 (2016).
E. J. Botcherby, R. Juskaitis, M. J. Booth, and T. Wilson, Optics Communications 281, 880-887 (2008).
E. J. Botcherby, R. Juskaitis, M. J. Booth, and T. Wilson, Optics Letters 32, 2007-2009 (2007).
J. Akerboom, T. Chen, T. J. Wardill, L. Tian, S. J. Marvin, S. Mutlu, N. C. Calderon, F. Eposti, B. G. Biorghus, X. R. Sun, A. Gordus, M. B. Orger, R. Portugues, F. Engert, J. J. Macklin, A. Filossa, A. Aggarwal, R. A. Kerr, R. Takagi, S. Kracun, E. Shigetomi, B. S. Khakh, H. Baier, L. Lagnado, S. S.-H. Wang, C. I. Bargmann, B. E. Kimmel, V. Jayaraman, K. Svoboda, D. S. Kim, E. R. Schreiter, and L. L. Looger, The Journal of Neuroscience 32, 13819-13840 (2012).
A. Pliss, L. Zhao, T. Y. Ohulchanskyy, J. Qu, and P. N. Prasad, ACS Chemical Biology 7, 1385-1392 (2012).
J. R. Janesik, *Photon transfer* (SPIE Press, 2007).
S. E. Bohndiek, A. Blue, A. T. Clark, M. L. Prydderch, and R. Turchetta, IEEE Sensors Journal 8, 1734 (2008)
Botcherby et al., PNAS, February 2012, 109 (8) 2919-2924, Aberration-free three-dimensional multiphoton imaging of neuronal activity at kHz rates.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments disclosed herein may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All publications, patent applications, patents, and other references mentioned herein are incorporated by reference in their entirety.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of" or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of" or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A system, comprising:
    a light source to generate an optical signal, the optical signal including a set of pulses at a first repetition rate;
    an optical multiplexer circuit to receive the optical signal and to generate a multiplexed optical signal including a set of pulses at a second repetition rate, wherein the second repetition rate is an n-multiple of the first repetition rate, wherein the set of pulses at the second repetition rate includes n sets of pulses, each set of pulses of the n set of pulses having a different polarization state than each other of the n set of pulses and being at the first repetition rate;
    a focusing unit to receive the multiplexed optical signal and to split the multiplexed optical signal into a set of n excitation signals to excite a sample, each excitation signal of the set of n excitation signals corresponding to a set of pulses of the n set of pulses;
    an objective to receive the set of n excitation signals and to illuminate the sample, wherein the objective and the focusing unit collectively focus each excitation signal of the set of n excitation signals on a different focal plane of the sample than each other excitation signal of the set of n excitation signals to generate a response signal in response to the set of n excitation signals; and
    an electronic demultiplexer circuit to demultiplex emission from the different focal planes and to generate a set of n emission signals based on the response signal, each emission signal of the set of n emission signals corresponding to an excitation signal of the set of n excitation signals.

2. The system of claim 1, wherein the objective is a first objective, the focusing unit including n sets of focusing optics, each set of focusing optics having a longitudinal axis different than the longitudinal axis of the other sets of focusing optics and setting a focus of one excitation signal in the set of n excitation signals, each set of focusing optics including:
    a quarter wave plate;
    a second objective; and
    a focusing mirror to independently adjust a position of the focal plane of the corresponding excitation signal.

3. The system of claim 2, wherein n=2, and wherein each set of pulses has a duty cycle of about 50%.

4. The system of claim 1, wherein n=2, the multiplexer circuit including an electro-optic modulator and a set of polarizing beam splitters to receive the optical signal and to generate the two sets of pulses as a first set of s-polarized pulses and a second set of p-polarized pulses.

5. The system of claim 1, wherein the light source is a laser source operating at a wavelength from about 700 nm to about 1000 nm, and wherein the first repetition rate is up to about 80 MHz.

6. The system of claim 1, further comprising a scanning unit in the optical path between the focusing unit and the objective, to scan each excitation signal of the set of n excitation signals in its respective focal plane in the sample.

7. The system of claim 1, further comprising a scanning unit in the optical path between the multiplexer circuit and the focusing unit, to scan each set of pulses of the n sets of pulses in its respective focal plane in the sample.

8. The system of claim 1, wherein the n sets of pulses include a first set of pulses and a second set of pulses, further comprising:

a beam splitter configured to split the first set of pulses and the second set of pulses;

a first scanning unit in the optical path between the beam splitter and the focusing unit, to receive the first set of pulses and to scan the first set of pulses in its respective image plane in the sample; and a second scanning unit in the optical path between the beam splitter and the focusing unit, to receive the second set of pulses and to scan the second set of pulses in its respective focal plane in the sample.

9. The system of claim 1, further comprising a detector communicably coupled to the demultiplexer circuit, to receive the response signal.

10. The system of claim 9, the multiplexer unit including a delay line to introduce a temporal separation between the n sets of pulses.

11. The system of claim 10, wherein the temporal separation is based on a) a duty cycle associated with each set of pulses of then sets of pulses, and b) a decay time associated with fluorescence emission from the sample in response to the set of n excitation signals.

12. The system of claim 9, wherein the demultiplexer circuit separates the response signal into the set of n emission signals based on a set of reference signals from the light source.

13. The system of claim 9, wherein the demultiplexer circuit includes a switch communicably coupled to the detector to generate the set of n emission signals based on a set of reference signals from the light source.

14. A method, comprising:
generating an optical signal including a set of pulses at a first repetition rate, wherein the first repetition rate is an n-multiple of a second repetition rate, wherein the set of pulses at the second repetition rate include n sets of pulses, each set of pulses of then set of pulses having a different polarization state than each other of the n set of pulses and operating at the first repetition rate;

splitting the optical signal into a set of n excitation signals to excite a sample, each excitation signal of the set of n excitation signals corresponding to a set of pulses of the n set of pulses;

focusing each excitation signal of the set of n excitation signals to a different focal plane of the sample than each other excitation signal of the set of n excitation signals to generate a response signal in response to the set of n excitation signals; and separating the emission from the different focal planes in the response signal into a set of n emission signals, each emission signal of the set of n emission signals corresponding to an excitation signal of the set of n excitation signals.

15. The method of claim 14, further comprising: independently adjusting a position of the focal plane of each excitation signal.

16. The method of claim 15, wherein the n sets of pulses include two sets of pulses, the generating including generating the two set of pulses as a first set of s-polarized pulses and a second set of p-polarized pulses.

17. The method of claim 14, further comprising scanning each excitation signal of the set of n excitation signals in its respective focal plane in the sample.

18. The method of claim 14, further comprising scanning each set of pulses of then sets of pulses in its respective focal plane in the sample.

19. The method of claim 14, wherein then sets of pulses include a first set of pulses and a second set of pulses, further comprising:
splitting the first set of pulses and the second set of pulses;
scanning the first set of pulses in its respective focal plane in the sample; and
scanning the second set of pulses in its respective focal plane in the sample.

20. The method of claim 14, further comprising receiving, via a detector, the response signal.

21. The method of claim 20, the separating further comprising separating the response signal into the set of n emission signals based on a set of reference signals.

22. The method of claim 20, the separating further including generating the set of n emission signals based on a set of reference signals.

23. A system, comprising:
a laser source to generate an optical signal, the optical signal including a set of pulses at a first repetition rate;

an electro-optic modulator and a polarizing beam splitter to receive the optical signal and to generate a multiplexed optical signal including a set of pulses at a second repetition rate, wherein the second repetition rate is twice the first repetition rate, wherein the set of pulses at the second repetition rate include a first set of pulses and a second set of pulses each at the first repetition rate, the first set of pulses having a different polarization state than the second set of pulses;

a focusing unit to receive the multiplexed optical signal and to split the multiplexed optical signal into a first excitation signal and a second excitation signal to excite a sample, the first excitation signal corresponding to the first set of pulses, the second excitation signal corresponding to the second set of pulses, the focusing unit including a first set of focusing optics and a second set of focusing optics having a different longitudinal axis than the first set of focusing optics, each of the first set of focusing optics and the second set of focusing optics including:
a quarter wave plate;
a second objective; and
a focusing mirror to independently adjust a position of the focal plane of its corresponding excitation signal;

an objective to receive the first excitation signal and a second excitation signal and optically coupled to the sample to illuminate the sample and to generate an emission from the sample, wherein the first excitation signal is focused on a first focal plane of the sample and the second excitation signal is focused on a second focal plane of the sample that is different than the first focal plane;

a detector configured to generate a response signal based on the emission from the sample; and a switch to separate the response signal into a first emission signal corresponding to the first excitation signal and a second emission signal corresponding to the second excitation signal.

* * * * *